United States Patent [19]
Gannon et al.

[11] Patent Number: 5,265,232
[45] Date of Patent: Nov. 23, 1993

[54] COHERENCE CONTROL BY DATA INVALIDATION IN SELECTED PROCESSOR CACHES WITHOUT BROADCASTING TO PROCESSOR CACHES NOT HAVING THE DATA

[75] Inventors: Patrick M. Gannon, Poughkeepsie; Michael Ignatowski, Red Hook; Matthew A. Krygowski, Hopewell Junction; Lishing Liu, Pleasantville; Donald W. Price, Lake Katrine; William K. Rodiger, Sudbury; Gregory Salyer, Woodstock; Yee-Ming Ting, Cornwall; Michael P. Witt, Fishkill, all of N.Y.

[73] Assignee: International Business Machines Corporation, N.Y.

[21] Appl. No.: 679,900

[22] Filed: Apr. 3, 1991

[51] Int. Cl.⁵ ............................................. G06F 13/00
[52] U.S. Cl. ........................... 395/425; 364/DIG. 1; 364/243.41; 364/243.44; 364/243.45
[58] Field of Search ................................. 395/400, 425

[56] References Cited
PUBLICATIONS

Censier et al., "A New Solution to Coherence Problems in Multicache Systems", *IEEE Transactions on Computers*, C-27 No. 12, Dec. 1978, pp. 1112-1118.
Chaiken et al., "Directory-Based Cache Coherence in Large-Scale Multiprocessors", *Computer*, vol. 23, No. 6, Jun., 1990, pp. 49-58.

*Primary Examiner*—David L. Robertson
*Attorney, Agent, or Firm*—Bernard M. Goldman

[57] ABSTRACT

A coherence directory and its methods of operation are disclosed for private processor caches in a multiple processor system to control data coherence in the system. It provides cross-invalidate (XI) controls for the assignment of exclusive and public ownership to data units in the processor caches, including required cross-invalidation of data units among the processor caches to obtain data coherence in the system in an efficient manner. The coherence directory can be used in a multiple processor system with or without any shared second level (L2) cache, shared or private. When a shared L2 cache is used to improve system access time, the coherence directory can also be used as the second level directory for the shared L2 cache and eliminate the need for any additional L2 directory(s).

46 Claims, 19 Drawing Sheets

FIG. 2

XI DIRECTORY ENTRY

| V | CH | | | LRU | CPID | ABS ADDR IN L3 |
|---|----|--|--|-----|------|----------------|

FIG. 3

L1 DIRECTORY ENTRY

| V | EX/RO | | | LRU | STD ID | ADDRESS |
|---|-------|--|--|-----|--------|---------|

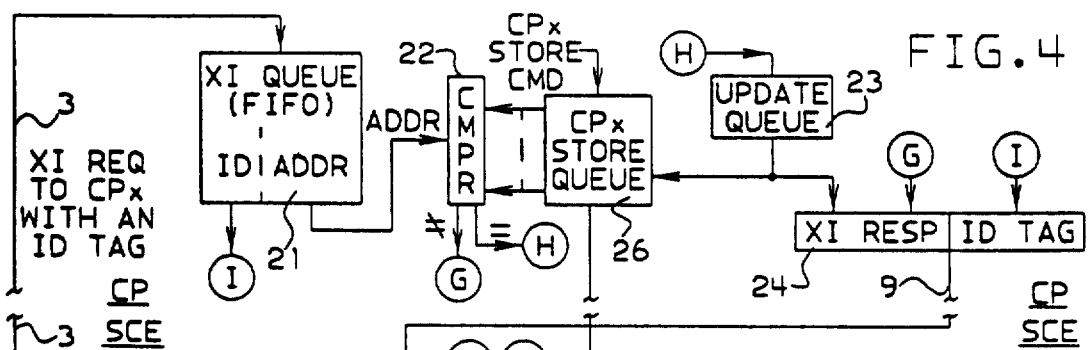

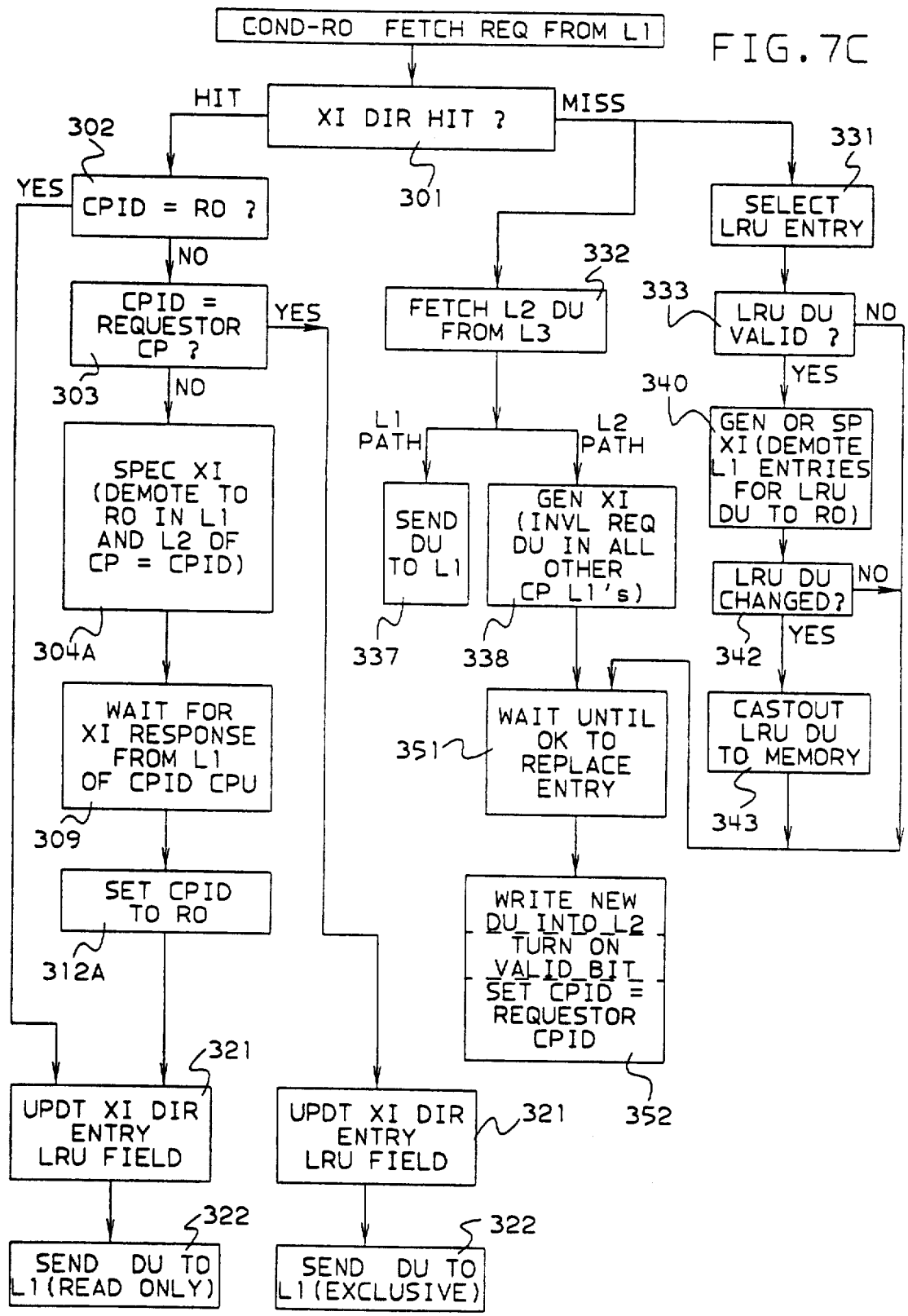

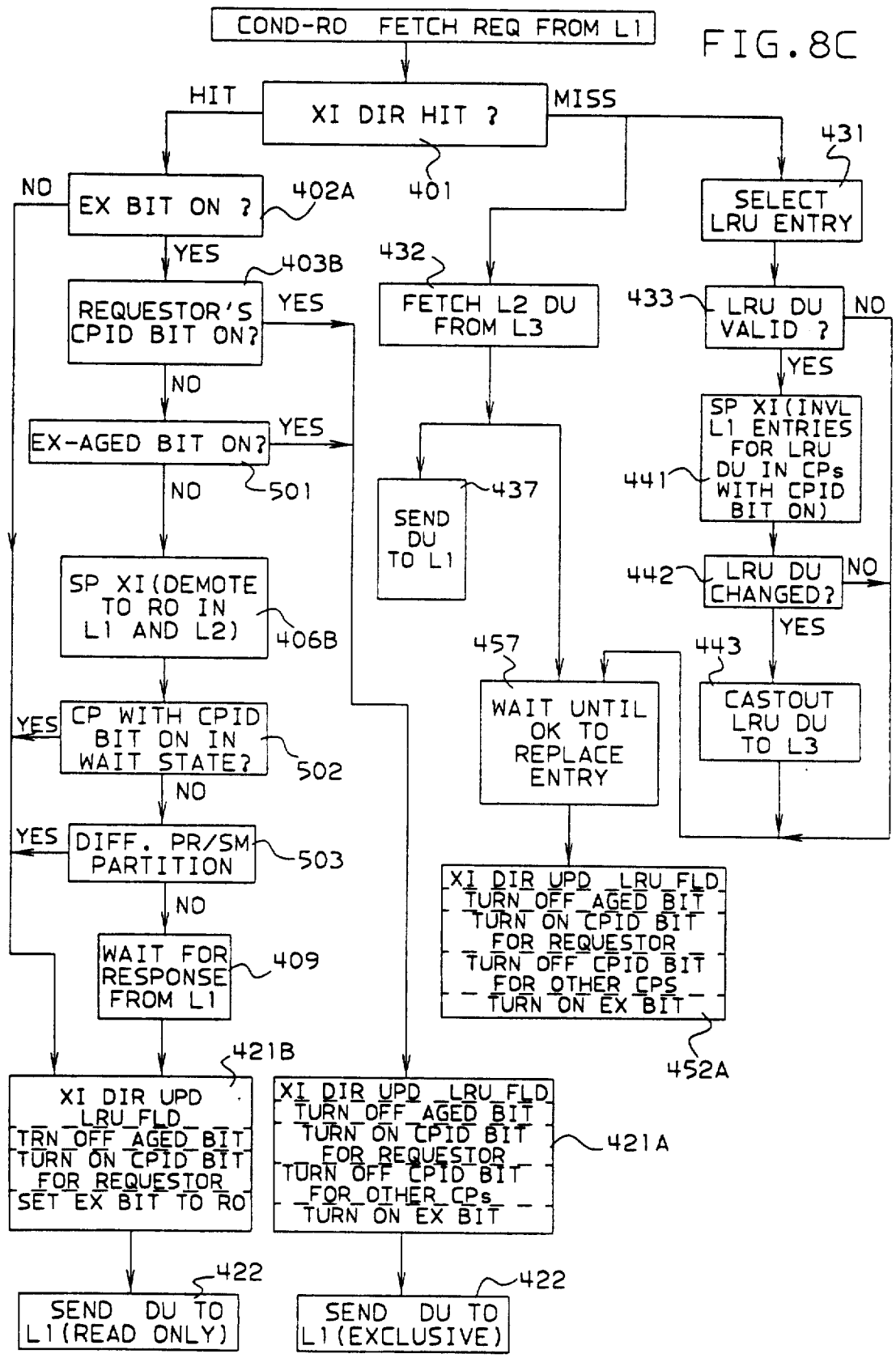

COHERENCE CONTROL BY DATA INVALIDATION IN SELECTED PROCESSOR CACHES WITHOUT BROADCASTING TO PROCESSOR CACHES NOT HAVING THE DATA

INTRODUCTION

The invention provides a novel cross-invalidate (XI) directory for private processor caches in a multiple processor system to control data coherence in the system. The XI directory controls the assignment of exclusive and public ownership to data units in the processor caches, including required cross-invalidation of data units among the processor caches to obtain data coherence in an efficient manner. The XI directory can be used in such a system with or without a shared L2 cache. When a shared L2 cache is used to improve system access time, the XI directory can also provide the directory function for the L2 cache and eliminate the need for any additional L2 directory(s).

Patent application Ser. No. 07/680,176, filed Apr. 3, 1993 entitled "Ownership Interlock for Cache Data Units", filed on the same day as this application and owned by the same assignee, has all of its content fully incorporated herein by reference and is considered part of this specification.

BACKGROUND OF THE INVENTION

Prior multiple-processor systems have used processor-private store-in L1 caches; and they have maintained the coherence of data in the system by using a set of copy directories, which are copies of all L1 cache directories. Each processor's fetch request is cross-interrogated in the copy directories of all other processors to find if any other processor has a copy of a requested data unit. This process assures that only one processor at a time can have exclusive (EX) ownership for writing in a data unit in the system. Only the one processor that has exclusive ownership of a data unit is allowed to write into the data unit. A data unit can also have public ownership (previously called readonly (RO) authority) which allows all processors to read (fetch) the data unit, but prohibits all processors from writing into the data unit.

The data coherence problem is simpler with a store-through type of cache, which requires all stores made in the L1 cache also be concurrently made in a backing memory. The memory backing the L1 private processor caches may be an L2 shared memory, or it may be the L3 main memory. The shared L2 cache may be store-in or store-through, but preferably is store-in to reduce the store bus traffic to main memory.

The store-in type of cache has been used in computer systems because it requires less bandwidth for its memory bus (between the memory and the cache) than is required by a store-through type of cache for the same frequency of processor accesses. Each cache location may be assigned to a processor request and receive a copy of a data unit fetched from system main memory or from another cache in the system. With a store-in cache, a processor stores into a data unit in a cache location without storing into the correspondingly addressed data unit in main memory, which causes the cache location to become the only location in the system containing the latest changed version of the data unit. The processor may make as many stores (changes) in the data unit as its executing program requires. The integrity of data in the system requires that the latest version of any data unit be used for any subsequent processing of the data unit.

A store-through type of cache is used only for fetching, and maintains the latest version of their accessed data units by having all store accesses change both the processor's store-through cache as well as the same data unit in a memory (another cache or main storage) at the next level in the system storage hierarchy. But the store-through characteristic of such caches do not solve the coherence problem in the system since another processor's store-through cache could contain an older version of the same data unit. Therefore, cross-interrogation of the contents of private processor caches in multiple processor systems is needed whether they are store-in or store-through when a new request is being fetched into a processor cache.

Exclusive ownership (authority to change a cache data unit) is assigned to any processor before it is allowed to perform its first store operation in a data unit. The assignment of processor ownership has been conventionally done by setting an exclusive (EX) flag bit in a cache directory (sometimes called a tag directory) associated with the respective data unit in the cache. The EX flag bit's ON state typically indicates exclusive ownership and the off state of the EX flag bit indicates public ownership (called "read-only authority"). Exclusive ownership by a processor allows only it to store into the data unit, but public (read-only) ownership of a data unit does not allow any processor to store into that data unit and up to all processors in the system to read that data unit (which can result in multiple copies of the non-changeable data unit in different processor caches in the system).

Typically, a cache fetches data units from its storage hierarchy on a demand basis, and a processor cache miss generates a fetch request which is sent to the next level in the storage hierarchy for fetching the data unit.

A store-in cache transmits its changed data units to main memory under control of cache replacement controls, sometimes called the LRU controls. Replacement of the data unit may occur when it has not been recently accessed in the cache, and no other cache entry is available for the new request. This replacement process is sometimes called "aging out" when a least recently used (LRU) entry is chosen to be replaced with a new request. The replacement controls cause the data unit (whether changed or not) in the selected entry to be replaced by another data unit (fetched as a result of a cache miss). When the data unit to be replaced in the cache has been changed, it must be castout of the cache and written into another place such as main memory before it is lost by being overwritten by the newly requested data unit being fetched from main memory. For example, a processor may request a data unit not currently in the cache, which must be fetched from main memory (or from another cache) using the requested address and stored in the newly assigned LRU cache location. The cache assignment of a location for the new data unit will be in a cache location not in current use if one can be found. If all of the useable cache locations are currently occupied with changed data units, then one of them must be reassigned for the new request. But before the new data unit can be written into the cache location, a castout to main memory is required of the updated cache data unit in that location. The castout process must then be used before the new data unit is written into the cache. The castout data unit has its ownership changed from an exclusive processor ownership to a main memory ownership.

If a data unit is not changed in the cache, it is merely overlayed to replace it without any castout, since its backing copy in main memory is identical.

U.S. Pat. No. 4,394,731 to Flusche et al teaches the use of an exclusive/readonly (EX/RO) flag in each entry in each private processor store-in cache directory for data coherence control in a computer system. A copy directory was provided for each processor's private L1 directory to identify the respective processor ownership of all data units currently in its cache, and the set of all processor copy directories was used to recognize which processor owned, or was publicly using, a data unit being requested exclusively by another processor in the system. Cross-interrogation was the process used among the copy directories to identify which, if any, processor had exclusive or public ownership of any data unit, which was done by comparing the address of a requested data unit with addresses in all copy directories. If the requested address was found in a copy directory, it identified a processor cache having that data unit. And cross-invalidation (XI) signalling was done from the identified processor's copy directory to its L1 cache to invalidate the entry for that data unit before passing the ownership of the data unit to another processor's cache.

This XI process assured exclusivity of a data unit to only one processor at a time by invalidating any copy of the data unit found in any other processor's private cache.

Hence, only one of the plural processors in a multiprocessing (MP) system can have exclusive ownership (write authority) at any one time over any data unit. The exclusive ownership over any data unit may be changed from one processor to another when a different processor requests exclusive ownership. The prior mechanism for indicating exclusive ownership for a processor was to provide an exclusive (EX) flag bit in each L1 directory entry in a processor's private L1 cache; and the EX bit was set on to indicate which of the associated data units were "owned" by that processor. The reset state of the EX flag bit indicated public ownership, which was called "readonly authority" for the associated data unit that made it simultaneously available to all processors in the system. Thus each valid data unit in any processor's private L1 cache had either exclusive ownership or public ownership.

The copy-directory XI technique of prior U.S. Pat. No. 4,394,731 automatically assigned the following ownership to a data unit fetched from main storage into a processor's private L1 store-in cache:

1. EX ownership when the data unit is not found in any processor's copy directory.

2. EX ownership when the data unit is found changed with EX ownership in another processor's copy directory. The requested data unit is castout of the other processor's cache before it is fetched into the requesting processor's cache.

3. RO ownership when the data unit is found not changed with EX ownership in another processor's copy directory, and the new request is deemed not likely to change the data unit (fetch request). Also, the found data unit is left in its cache where its ownership is changed from EX to RO.

4. EX ownership when the data unit is found with RO ownership in one or more other processor's copy directories, and the new request is deemed to likely change the data unit (store interrogate request). The found data unit is invalidated in the other processor's cache. This XI operation uses a time-consuming process called "promote to exclusive".

5. RO ownership when the data unit is found with RO ownership in another processor's copy directory. Also, the found data unit is left in its processor's cache with its RO ownership.

6. RO ownership when the data unit is a page table entry found with RO public ownership set in the entry, regardless of the type of processor request.

Patent application Ser. No. 07/680,176 filed on the same date as the subject application and assigned to the same assignee describes and claims an ownership interlock control for cache data units. It interlocks a change of ownership for an exclusively-owned data unit in a store-in cache with the completion of all stores to the data unit issued by its processor up to the time it responds to a received cross-invalidate (XI) signal caused by another processor requesting the data unit either exclusively or with public ownership.

SUMMARY OF THE INVENTION

The invention provides a cross-invalidate (XI) directory shared by processors in a multiple processor system (MP) for controlling the coherence of data in a shared memory. The XI directory may have different hardware sections respectively associated with different hardware sections of a system backing memory divided by address to obtain parallel accessing in the XI directory and the system backing memory. Each processor has its own private (L1) cache for containing copies of data units fetched from the shared memory. The shared memory may be the system main memory, or may be a shared cache (L2) in the memory hierarchy.

The XI directory is accessed by requests to the shared memory (to the L2 cache, or to main memory if there is no L2 cache). The processor private L1 caches may be store-in or store-through types of caches. The XI directory may be located in a system storage controller (SCE) which interfaces the private L1 CPU caches to any shared L2 cache and to the system main memory (L3). The shared directory is accessed by a CPU request for a data unit (sometimes called a "line" of data) when the CPU request misses in its private cache (i.e. does not find the requested data unit in its private cache).

Thus, if an (L2) cache is used, the XI directory also may be the L2 directory for the L2 cache without having any L1 copy directories in the system. And if a CPU request misses in the XI cache, it is an L2 cache miss and system main storage is accessed for the CPU requested data unit, which is fetched both into the L2 cache and into the requesting processor's L1 cache.

But if the XI directory is used without an L2 cache, its directory content controls accesses to requested data units in system main memory as well as data coherence among the private processor caches. It is desirable that the XI cache has a valid entry for each data unit in all private CPU caches.

Each entry in the XI directory of this invention uses a processor identifier (CPID) field to identify which, if any, processor(s) own the associated data unit, and indicates whether the ownership is exclusive (EX) or public (RO). Exclusive ownership means that only one of the processors is the owner of the data unit. Public ownership means that all processors in the system have a common ownership of the data unit. The use of a CPID field(s) in each entry eliminates the need for a plurality of copy directories (copies of the L1 private CPU cache directories previously used for providing CPU identification in response to a CPU fetch request for EX ownership of a requested data unit in main storage by any of the plural processors in a system). The elimination of copy directories and their cross-interrogation speeds up the average processor access to memory data by eliminating several operations in the critical processing path of handling processor fetch requests requiring that a processor acquire exclusive ownership.

This invention uses the CPID field (in a directory entry accessed by a request) to generate an XI request to the current owner(s) of the data unit identified by the CPID field when a request requires a change in ownership of the data unit. An XI request is only sent to a processor(s) other than the requesting processor. The XI signal requests the other CPU's L1 cache to terminate its ownership by invalidation (or to change it to public ownership), which must be done before the data unit can be used by the requesting CPU.

The generated XI signal includes a identifier tag representing its requestor and an EX/RO indicator of whether exclusive or public ownership is being requested. The XI signal is sent on XI busing to the CPID identified processor. The XI busing may comprise a plurality of buses, one to each CPU, from the XI signal generating means, of which a particular XI transmission is provided only on the bus(es) selected by the CPID for the XI operation. Alternatively, the XI busing may be a single bus serially connected to all processors, in which each processor can detect and select an XI signal containing the processor's address. The receiving processor stores its received XI signals into an XI queue (sometimes called a BIAS, buffer invalidation address stack).

As soon as each XI signal is transmitted for a request by XI hardware (SCE XI circuits located with the XI directory), the SCE XI circuits can immediately transmit another request, because the requestor's ID tag is carried to the processor receiving any XI signal. The receiving processor processes the received XI signal and then provides an XI response signal containing the related ID tag. Then, the SCE uses the ID tags in its received XI responses to correlate them with its transmitted XI requests, and this correlation is used by the SCE to consummate the ownership change required for each requested data unit. The ID tags with the XI signals and the XI responses allows them to be processed in a pipelined manner in both their generation and transmission in the SCE and in their processing in the receiving processors.

This invention provides for different types of CPIDs, although only one CPID type may be used in each entry of the XI directory in a particular system. For example, one CPID type provide a combination of bits in each CPID field to represent a CPID value. Any processor having exclusive ownership of the associated data unit is identified by a unique CPID field value. And another unique CPID field value indicates when all processors may have public ownership of the associated data unit. This type of CPID value field does not require any EX/RO field in the XI directory entry, because different CPID values respectively identify each CPU having exclusive ownership, and the public ownership CPID value represents all CPUs as having the capability of public ownership without identifying any particular CPU.

Another example of a different type of CPID field provides a set of bits in which each bit, when set on, identifies a respective processor as an owner of the associated data unit. This type of CPID field is used in combination with an EX/RO field in the same XI directory entry to indicate whether exclusive or public ownership of the associated data unit is obtained by the identified processor(s). The CPID field is allowed to identify only one processor in the set when the EX/RO field indicates EX ownership, but the CPID field can identify from zero to all processors in the set when the EX/RO field indicates public ownership. Thus, the combination of the CPID and EX/RO fields in an XI directory entry is able to specifically identify one processor in a set of processors as having exclusive ownership, or to specifically identify zero or more processor in up to all processors in the set as having public ownership of the associated data unit.

Also, each L1 directory entry has an EX/RO field, but no CPID field, for each data unit in its private-processor cache. The L1 EX/RO field operates in combination with a correspondingly addressed XI entry in the XI directory having either the CPID field alone (without an EX/RO field), or having the CPID field combined with an EX/RO field, depending on whether or not specific identification is required for processors having public ownership, in addition to both cases providing specific identification of a processor having exclusive ownership. When the EX field is set on in an L1 entry, it indicates its processor has the authority to change (write) into the associated L1 cache data unit owned exclusively, and no coherence signalling with the XI directory is required for L1 hits obtaining fetch or store L1 accesses. The elimination of coherence signalling for fetch or store hits to valid data units in the L1 cache increases the efficiency of CPU operations, whether the L1 caches are of the store-in or store-thru type.

A cross-invalidation (XI) signal always requests its receiving processor to terminate its exclusive ownership being indicated in both its L1 cache directory and in the XI directory. But a cross-invalidation (XI) signal need not request its receiving processor to invalidate all ownership of the associated data unit, but instead may request the processor only to change-to-public-ownership. Invalidation of the data unit in the receiving processors L1 cache directory is the way a processor gives up all ownership.

A specific XI signal always requests the CPU identified in the accessed CPID field to give up its exclusive ownership, but the XI signal does not always signal a termination of ownership. Hence, an XI signal can instead signal a change-to-public ownership which is a reduction in the CPU's ownership. Accordingly the term, XI, stands for cross-invalidation, but XI signals are used for more than invalidation since they may instead signal for a reduction from exclusive to public ownership by requesting the identified CPU to change to public ownership by a "demote-to-RO" signal. To do these different functions, an XI signal has a operation field that tells its receiving CPU what it is to do with the XI signal, which is: invalidation or demote-to-RO.

This invention does not physically perform any cross-interrogation operation (required with copy directories), but obtains the result of a cross-interrogation operation by merely detecting the CPID field alone, or by detecting the CPID and EX/RO fields together, depending on the type of entry being used in the XI directory. (The accessed XI entry may be an XI hit entry having an address matching the address of an L1 miss request, or may be an XI miss entry assigned by the XI directory replacement controls.) Thus, there is no cross-interrogation signalling required in this invention, as was previously required among plural copy directories before an XI signal could be issued to any processor L1 cache, such as in prior U.S. Pat. Nos. 4,394,791 or 4,675,811.

The invention also includes several other features which decrease the signalling required in a system to increase system efficiency in handling XI requests.

One feature detects whether a processor is in wait state when it receives an XI request from a requestor (e.g. another processor) wanting a data unit exclusively. A set of latches (located with the XI directory in the SCE) respectively represent the wait states of all processors in the system. A processor is indicated in wait state when its latch is set on and not in wait state when its latch is set off, and each processor controls the state of its wait state latch. If any processor (not in wait state) exclusively requests a data unit which gets an XI hit in an entry indicating EX or RO ownership by another processor (the CPID processor), the wait state latch of the CPID processor is checked to determine if it is in wait state or not. If the CPID processor is indicated in wait state, the requestor can immediately acquire ownership of the requested data unit (e.g. by the CPID field being changed in the entry from the XIed processor to the requestor) without waiting for an XI response from the XIed processor, as is normally required. By eliminating the delay for receiving an XI response to exclusive requests, the wait state controls speed up the accessing of data units owned by processors in wait state.

Another feature of this invention is an exclusive-aged bit in each XI directory entry. The EX-aged bit is provided as a flag bit in the XI directory entries. The aged bit is set on in the XI directory entry when its corresponding exclusively-owned data unit is aged out of a processor's L1 cache (but not out of the XI directory) by the L1 directory replacement controls (often called L1 LRU controls) so that the L1 processor can use the entry for a different data unit. A discovery of this invention is that the XI signalling overhead (which was done to get the exclusive ownership for this data unit which has aged out of the L1 cache) need not be repeated for the next L1 access of the same data unit by any processor while the data unit is represented in the XI directory. The EX aged bit is set off in the XI directory entry when the data unit is next accessed by any processor for its L1 cache. While the aged bit is on, any CPU can exclusively fetch the XI data unit (and obtain exclusive ownership) without the overhead of any XI signalling. If any CPU does a conditional-exclusive fetch of the data unit while its aged bit is set on in the XI directory, only the aged-out CPU will get the data unit with exclusive ownership, while any other CPU will get the data unit in its L1 cache with public ownership whereby the data unit is demoted to RO in the XI directory.

A further feature of this invention is that the size of each data unit in the processor-private L1 caches may be a submultiple of the size of each data unit represented by each entry in the XI directory (which represents data units in system main memory or in an L2 shared cache). The data unit size represented in the XI directory is an integer multiple of the data unit size in the processor caches, for example twice the size. An advantage in representing a larger data unit in the XI directory than in the L1 directories is to reduce the size of the XI directory (since it has fewer entries), which reduces the amount of XI signaling to increase system performance.

The coherence controls reflect the data unit size difference. Thus the processor ownership represented by the CPID field in an XI directory entry for a larger data unit also represents the ownership of the smaller data unit in the L1 cache directory. Therefore, if a processor has EX ownership of a smaller data unit in its L1 cache, then the CPID in a related entry in the XI directory for the related larger data unit also represents the ownership of the related smaller L1 data unit, which is a part (e.g. $\frac{1}{2}$) of the larger data unit for XI coherence control reasons. The remaining part of the larger unit cannot simultaneously be represented for exclusive ownership in another L1 cache, since only one exclusive processor CPID can be represented in an XI directory entry. But the multiple smaller data units can have public ownership in different processor caches. If different parts exist RO in plural processor caches, and a processor requests any part with EX ownership, then all parts of the data unit are invalidated in the other processor caches; and the data unit is marked exclusive with the CPID of the requesting processor in the XI directory entry, and only the requested part is fetched EX into the requesting processor's L1 cache.

It is possible to represent multiple exclusive-owning processors in each XI directory entry for the different sub-multiple parts (each part equal to the L1 data unit size). But this may entail significant overhead and may not obtain a sufficient increase in system performance to be worth the effort. If multiple-EX representation is desired, then multiple CPID fields, each having a respective EX/RO field, could be provided in each XI directory entry, in which each CPID & EX/RO pair of fields is associated with a respective sub-multiple part of the XI directory entry's data unit.

Another feature of this invention is aggressive public (RO) fetching of "conditionally-public" fetch requests for a version of this invention using store-thru L1 caches and an XI directory with an L2 cache. A "conditionally-public" type of fetch request is any request to fetch a data unit not previously committed to being stored into or being only fetched. Most requests are for fetches rather than stores. Previously, "conditionally-exclusive" fetching was used, in which a bias was caused in returning a fetched data unit with exclusive ownership. This invention finds an advantage in aggressive public fetching for fetches which previously were handled as conditionally-exclusive. A conditionally-public fetch returns data with public (RO) ownership, unless the requests misses in the XI directory, or if the XI directory already indicates exclusive (EX) ownership of the data unit by the requesting CPU. (Prior IBM systems returned a data unit with EX ownership for a "conditionally-exclusive" fetch request when the data unit was found for an XI request with either EX or RO ownership). This feature is advantageous in a system in which the L1 cache is store-thru, since no castout can occur for a store-thru L1 cache entry owned EX if it is later changed to RO ownership (unlike an L1 store-in type of cache in which an XI operation called "demote to RO" would cause a castout if a store had changed the data unit during its prior EX ownership.)

DESCRIPTION OF THE DRAWINGS

FIG. 2 shows the form of each entry in the XI directory represented in FIG. 1.

FIG. 3 shows the form of each entry in each CPU's private L1 cache director shown in FIG. 1.

FIG. 4 represents XI hardware found in each CPU in the system of FIG. 1.

FIG. 5 represents XI hardware in an SCE (storage control element) containing the XI directory and L2 cache shown in the system of FIG. 1.

FIGS. 7A, 7B, 7C and 7D provide flow diagrams of a process that operates on the the system shown in either FIG. 1 or 11 for performing an embodiment of the invention.

FIG. 8A, 8B, 8C, 8D and 8E provide flow diagrams of another process that operates on the system shown in either FIG. 1 or 11 for performing the preferred embodiment of the invention.

DETAILED DESCRIPTION OF THE EMBODIMENT

Figure 1:
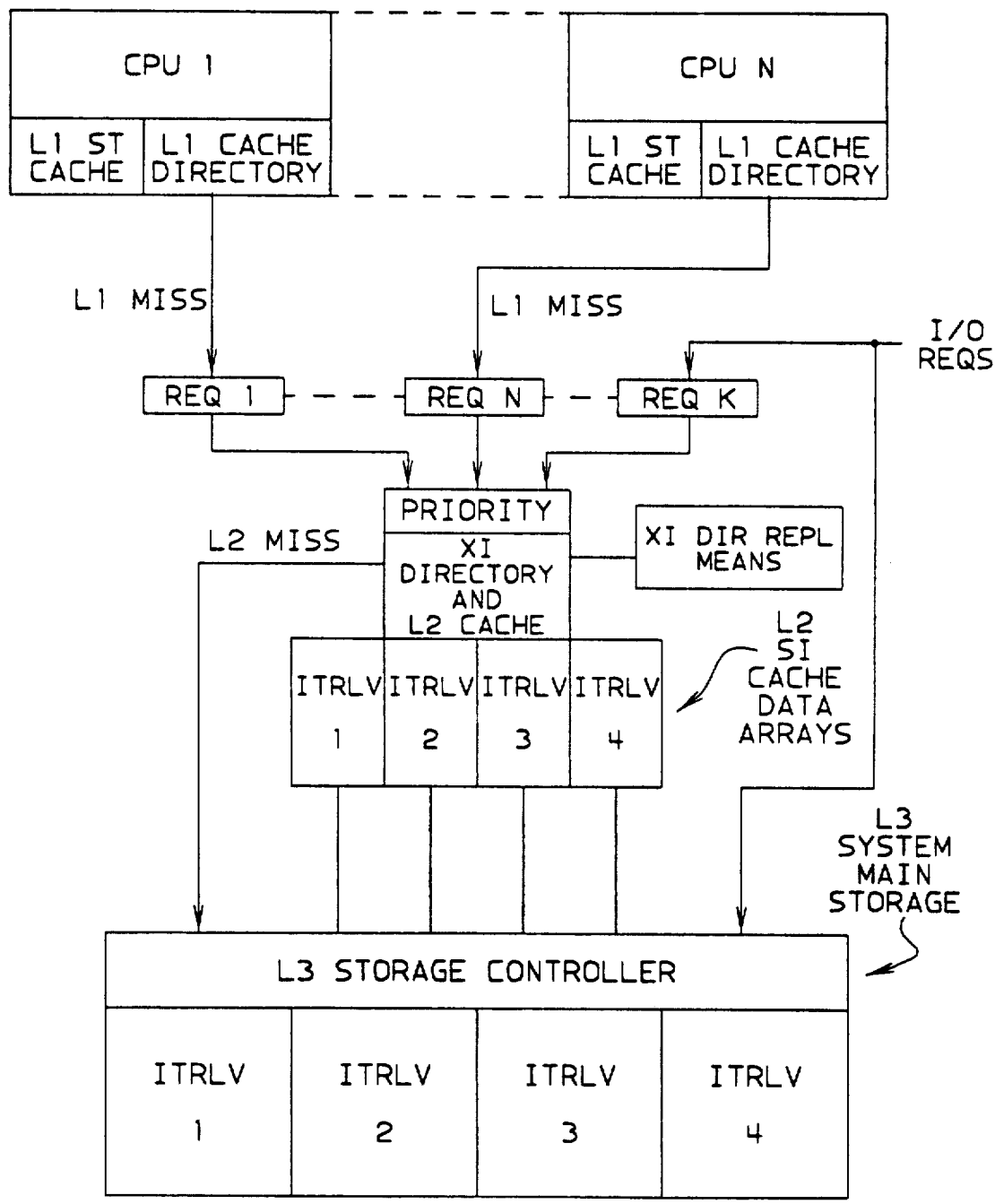
FIG. 1 represents one form of a data processing system containing private CPU store-thru L1 caches and an L2 cache with an XI directory.
Figure 9:
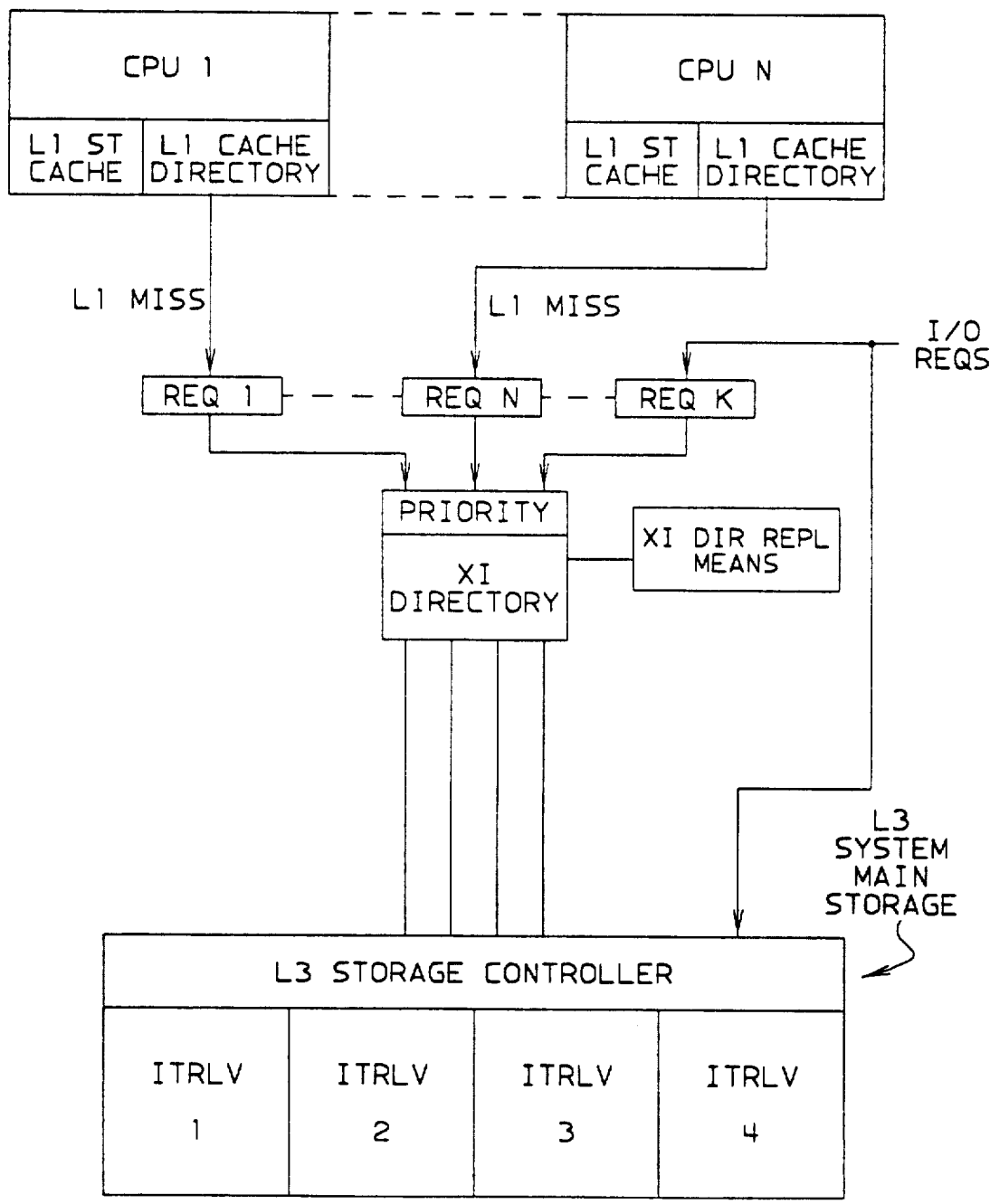
FIG. 9 represents another form of data processing system containing private CPU store-in L1 caches and an XI directory without any L2 cache.
Figure 10:
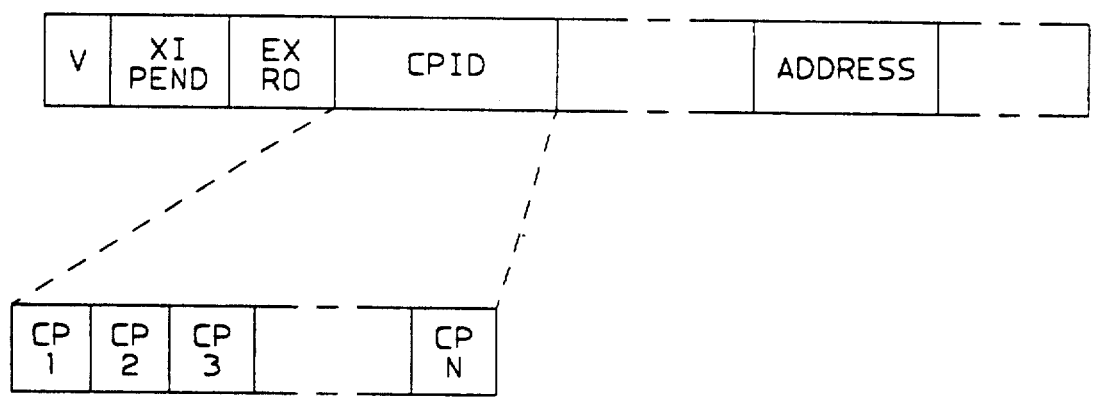
FIG. 10 shows the form of each entry in the XI directory represented in FIG. 9.

FIGS. 1 and 9 each represent a multiprocessor system (MP) containing central processing units (CPUs) 1-N in which each CPU contains one private cache and may have two private caches, an instruction cache and a data cache. Only the data cache can receive stores. The instruction cache is readonly and cannot be stored into by the processor.

The CPU accesses its instructions from its instruction cache and accesses its operand data from its data cache. Both the data cache and instruction cache are used for fetching a data unit requested by their CPU.

Each L1 data cache is a store-through type of cache, and hereafter it is referred to as each CPU's L1 cache for FIG. 1. If an instruction is to be stored into, it is done only in the instruction's data unit in the L2 cache, and then that data unit is fetched into the requesting instruction cache as a readonly data unit.

Although the instruction caches are readonly and do not receive store requests, they receives XI requests (like any data cache). An XI request to an instruction cache likewise controls the invalidation of a data unit in the instruction cache for which exclusive ownership is required by any data cache. And an XI request to a data cache may be caused by an instruction cache when it wants to fetch a data unit which is owned exclusively by any data cache, which causes a change-to-public-ownership in the data cache.

FIG. 1 has an L2 cache, and FIG. 9 does not have an L2 cache. Thus, the next level in the storage hierarchy after the L1 cache level in FIG. 1 is the L2 cache, and in FIG. 9 is the L3 main memory. In both FIGS. 1 and 9, the XI directory is accessed by fetch requests that miss in any L1 cache.

In FIG. 1, the XI directory also serves as the L2 cache directory to receive fetch requests that miss at the L1 cache level, and to receive all store requests from the CPUs. Store commands do not control ownership changes in the manner of fetch requests because all stores to any data unit are preceeded by a fetch request that obtains the data unit in the respective cache prior to the issuance of any store commands to the data unit.

In FIG. 1, if a CPU request is not found in the XI directory, then the XI directory has a "XI miss", which in FIG. 1 is also an L2 cache miss, and the requested address is sent to system main storage (L3), from which the requested data unit is fetched and is sent on the memory bus to the L2 cache, and to the L1 cache of the CPU generating the request. The data unit for the L1 cache need not be the same size as the data unit in the L2 cache which contains the L1 data unit. Thus each L1 data unit may be sub-multiple of an L2 data unit, or they may be the same size.

Once the data unit is fetched into the caches, commands to store marked bytes of data in the data unit are issued to accomplish the store operations. Thus all store commands follow an L1 fetch request for obtaining the required data unit in both the L1 and L2 caches.

The XI directory contains an input priority circuit that receives all requests to the L2 cache, i.e. all fetch requests and store commands from all CPUs and all I/O devices. The priority circuit selects one request or command at a time for accessing in the L2 cache directory. A high-order field in the selected request or command selects a row (congruence class) in the XI directory (not shown) and a comparison with an address portion finds any assigned cache directory entry and associated cache data unit location, as is conventionally done in set associative caches so these cache contained items are not shown herein. Each L1 and L2 cache herein is presumed to be a 4-way set associative cache.

In FIG. 9, each request from L1 goes to the controller for the L3 main memory, and operates similarly to the way a request is made to the L2 cache. The size of each data unit in L3 may be the same size as a data unit in the L2 cache of FIG. 1, which is a multiple of the size of the data unit in the L1 cache.

Each XI directory entry contains the fields shown in FIG. 2, and each L1 directory entry contains the fields shown in FIG. 3. Each XI entry contains a CPU identifier (CPID) field (e.g. three bits) which are combinatorially set to a value (e.g. 1 to 6) that can identify one CPU in the MP which is the current exclusive owner of the corresponding data unit in the L2 cache and in L3 main memory. A zero value in the CPID field indicates a public ownership for the corresponding L2 and L3 data unit.

When the current request to the XI directory does not find an entry therein, an XI miss occurs. Then an XI directory replacement means assigns an entry (which is the current LRU entry) in the set-associative row being addressed by the current request. The missed request is sent to L3 to fetch the requested data unit.

If in FIG. 1 a requested address is not found in the addressed row in the XI directory, a conventional LRU replacement means allocates a replacement entry for each directory row (congruence class), in which the LRU one of the four set-associative entries in each row is a candidate for being the next assignable entry in the row for allocation to a requested data unit that must be fetched from L3 memory. Generally, the candidate entry is a currently invalid entry, but if there are no invalid entries, the LRU entry is selected of the four entries in each row.

Before a requested data unit can be obtained from L3 and stored into the cache slot associated with a newly allocated L2 entry (the associated slot in a cache data array, any old data unit existing in that slot (represented by the current content of the L2 directory entry) must be checked in the directory entry to determine if it has changed data. This is done by checking the state of a change field (i.e. change bit) in content of the L2 entry before the entry is changed to represent the newly requested data unit. If the old data unit has been changed (as indicated by its CHG bit), it is the latest version of the old data unit which must be castout to the same address in main memory before the newly requested data unit can be stored in the associated location in the cache.

The L2 cache in FIG. 1 is internally interleaved using the four ITRLVs illustrated. The four L2 interleaves each have a separate bus to the L3 main memory, which is also shown with four L3 interleave sections connected to the L3 storage controller. However, the L3 interleave size need not be the same size as the L2 cache interleave size, even though the L2 and L3 data unit sizes are the same. For example, each single L3 data unit (comprising dozens of bytes) may be contained within any one of the four L3 interleaves. But each single L2 data unit (same size as an L3 data unit) may be contained in all four L2 interleaves, in which each L2 interleave has ¼th of the L2 data unit. Each L2 data unit may be sequentially accessed in the four L2 interleaves by starting with the interleave having the part of the L2 data unit containing the byte address of the L2 request being accessed. But any sub-multiple of the L2 data unit size may be used as the L2 interleave size.

Figure 11:
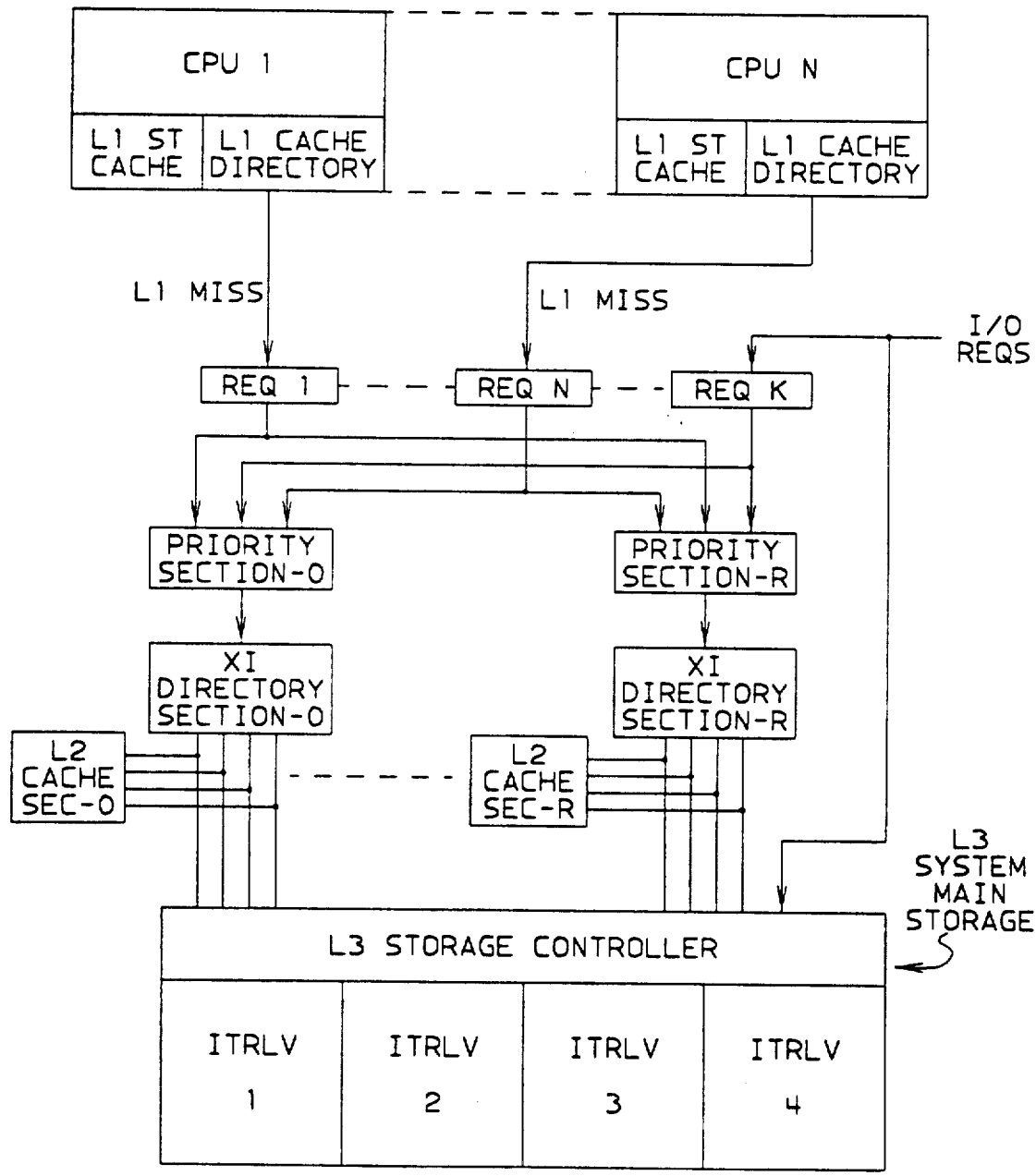
FIG. 11 shows the form of each entry in each CPU's private L1 cache directory shown in FIG. 9.

FIG. 11 also provides a system having multiple CPUs, which essentially operates the same as the system in FIG. 1 or 9. But FIG. 11 permits plural L2 data units to be processed simultaneously in the XI directory; while FIG. 1 processes one L2 data unit at a time, even though it is four way interleaved in the L2 cache. In FIG. 11, the XI directory is divided by address into different hardware sections to obtain parallel accessing of plural requests among the different sections of the XI directory. The XI directory sections are section 0 to section R, and the number of sections is preferably a power of two. Priority section 0 to priority section R are the respective priority means. Each section can be accessing a request in its subset of addresses simultaneously with accessing other requests in the other sections in their respective subsets of addresses. Each XI directory section has its respective priority means, which receives all request addresses being provided by all CPUs, I/O and internally in the memory system. The priority means filters the received request addresses and passes one address at a time to its respective XI directory section. Filtering is done by selecting and passing an address within its respectively assigned subset of request addresses under a priority selection process.

Each XI directory section in FIG. 11 may have a respective cache section that contains the L2 data units that can be addressed by addresses outputted from its associated priority means. If no L2 cache is used in the system, then the multiple-section XI directory in FIG. 11 fundamentally operates in the manner of the system in FIG. 9, except that the FIG. 11 system can process plural XI requests in parallel in its different sections, which in some cases can obtain a significant improvement in system performance.

Thus FIGS. 1 and 9 generally illustrate multiprocessor (MP) computer systems which may contain the subject invention. Each system includes N number of CPUs each having a private store-through cache (L1) with its L1 cache directory. Each CPU accesses storage fetch requests in its L1 cache as long as it obtains cache hits indicating the requested data is available in its L1 cache. FIG. 9 does not have an L2 cache.

When requested data is not available in its L1 cache, the L1 cache miss causes a fetch request to the next level in the system storage hierarchy, which is the L2 cache in FIG. 1 and the L3 main memory in FIG. 9, where the fetch request is put into a request register, REQ 1-REQ N, associated with the miss requesting CPU. The CPU request includes the main memory address of the requested data unit and the type of ownership being requested for it which may be either exclusive or public ownership.

After a data unit has been fetched into a CPU's L1 cache from the L2 cache, the CPU may make store commands for storing data into the data unit. A store command usually does not overwrite the entire data unit in either the L1 or L2 cache, but may write only changed byte(s) which are marked into the data unit (which may, for example, contain dozens of bytes). This manner of writing into a data unit is well known in the art, using marker bits in the store command to represent the parts of a data unit to be changed by a given store command. The writing into the L2 cache may be done in the same way or it may done by copying the entire data unit from L1 into L2 immediately after the data has been written into the L1 cache.

Also an I/O request register, REQ K, receives all input and output (I/O) device requests to memory. In FIG. 1, an I/O request accesses the L2 cache since the latest version of a data unit may reside in the L2 cache, where it may be changed by the I/O request. If the I/O request is not in L2, it is then accessed in the L3 main memory without accessing the data unit into the L2 cache.

REQ 1-REQ K present their contained requests to the input priority circuit of the XI directory. The presented requests are sequenced on a machine cycle, or sub-cycle, basis by the priority circuit which presents one request at a time to the XI directory for accessing.

Figure 6:
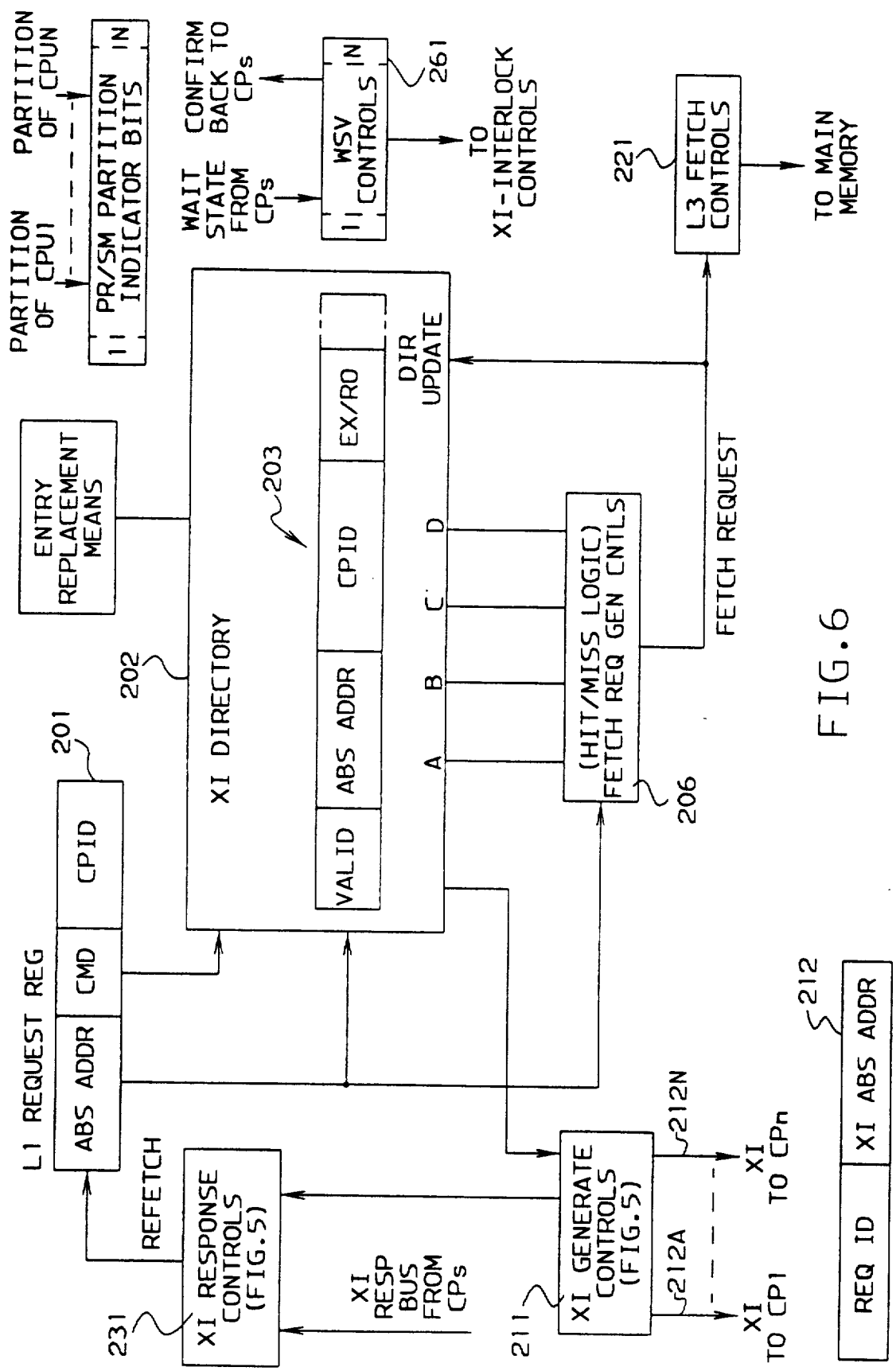
FIG. 6 represents various hardware controls found in the SCE of the system represented in FIG. 1.

FIG. 6 shows hardware controls that are associated with an XI directory 202, which may be the XI directory in either FIG. 1 or 9, except the EX/RO field in each directory entry is not needed in the embodiment of FIG. 1. An L1 register 201 is any of the request registers 1 through N in FIG. 1 or 9; it has an absolute address field, a three bit command field (bits 0:2), and a Req_CPID field. The absolute address field contains the main memory address of the requested data unit. The Req_CPID field contains the CPID (CPU identifier) of the requesting CPU (bits 0:2 for supporting up to 7 CPUs). The three bit command field provides any of four different commands, which are: readonly request, exclusive request, a conditionally-public (i.e. conditionally-readonly) request, and a change-to-exclusive request.

The hit/miss logic 206 indicates whether the currently requested data unit is represented in the XI directory in the systems of both FIGS. 1 and 9. A hit occurs if the data unit is completely represented and signals access can be made without a change of ownership in the XI directory or in the associated data store. And it is a miss if the data unit is not represented which requires at least a change of ownership indication in the accessed XI directory entry.

In FIG. 1, fetch controls 221 is activated by hit logic 206 to access the requested data unit in the L2 cache for a hit, and for a miss sends a request to the L3 memory for accessing the requested data unit. In FIG. 9, fetch controls 221 are activated by the hit logic 206 to access the requested data unit in the L3 memory for both a hit or miss.

If a complete change of the accessed entry is required, such as for the castout of the represented data unit and a fetch of another data unit, the next level of storage must be accessed.

The XI generate controls 211 (shown in more detail in FIG. 5) generate an XI signal from the CPID field in an accessed entry, and selects the XI buses 212a-212n to the respective CPUs for transmitting an XI signal to the CPU(s) indicated by the CPID field in the accessed entry. A specific XI request is only sent on the XI bus the identified CPU in both FIGS. 1 and 9. Each specific XI request has a request identifier (TAG) and an XI address which is the main storage address (or representation) of the address to be invalidated or have its ownership changed in the identified CPU L1 cache. A general XI request is sent on all XI buses to all CPUs only in the embodiment of FIG. 1.

The XI response controls 231 (shown in more detail in FIG. 5) receive the CPU response, which is responding to a specific XI signal sent to the CPU. The XI response controls the timing of when the XI directory controls can complete their processing for an access request (from another CPU, I/O or castout) that had the ownership conflict found in the XI directory which caused the XI signal. Then the SCE can change the ownership indication in the accessed directory entry, which may involve only changing the ownership indication therein or may involve writing therein an entirely new content for representing a newly accessed data unit in the case of a castout request.

An exceptional XI response may indicate that the CPU was not able to give up ownership when requested, requiring the SCE controls to resend an identified XI signal, or that the CPU needs to get back the ownership of a data unit to perform a store in it when it had been marked in the CPU at the time the CPU gave up ownership of the data unit.

In FIG. 6, wait state vector (WSV) controls 261 are provided in the SCE to support the embodiment shown in FIG. 9. WSV comprises eight bits that respectively correspond to the CPUs in the system. The corresponding CPU sets on its WSV bit when the CPU enters wait state, and sets it off when it leaves wait state. However, to avoid a short time window when the wait state indication might not represent the true state of the CPU, a request/response protocol is used between the WSV set and reset control circuits and the respective CPUs.

FIGS. 4 and 5 show the hardware pipeline contained in each of the CPUs and the SCE shown in FIG. 1 and 9. The store pipeline in FIGS. 4 and 5 connects the stores from any CPU to the shared L2 cache. The nomenclature CPx is used in FIGS. 4 and 5 to designate any of the N number of CPUs that is currently receiving an XI signal from the SCE.

Each CPU store command causes storing in both the respective CPU's L1 cache and in the shared L2 cache. The manner of storing in L1 may be conventional. FIG. 4 shows a store queue 26 which receives the store commands from its CPx in FIFO order, and sends them to a store stack 27 (located in the SCE, which is the L2 cache and L3 main memory controller) which is in FIG. 5. The stack outputs its oldest store command to the L2 priority circuit for accessing in the L2 directory and L2 cache. Each store command in the store queue 26 and store stack 27 contains both the address and the data for a single store operation.

The FIFO order of handling store commands in stack 27 is maintained by inpointer and outpointer registers, INPTR & OUTPTR. INPTR locates the current entry in the stack for receiving the next store from queue 26. OUTPTR locates the oldest store in stack 27 to be outputted to the L2 cache. INPTR is incremented each time a store is received in the current inpointer location, and OUTPTR is incremented each time a store is outputted from the stack. Both the INPTR and OUTPTR wrap in the stack so that the stack never runs out of space for a next entry. This type of stack pointer control is conventional.

The CPz, IOy or CORn request command registers 1z, 1n or 1y respectively receive the L1 CPU fetch requests, L2 cache LRU replacement requests and I/O device requests for accesses in the L2 cache. Each request command (i.e. requestor) puts into a request register the main memory address (or a representation thereof) of the requested data unit and the requested type of ownership (EX or RO). The registers 1z, 1n and 1y represent different types of request registers, of which only one register is doing a request into the L2 cache at any one time in the embodiment. One of these registers is selected at a time by the L2 priority circuit for a current access cycle for accessing an entry in the L2 directory and its associated cache slot that contains the associated data unit.

Thus CPz request register 1z represents any L2 request register that receives any CPU request to L2. The subscript z indicates the CPU is a requesting CPU, while the subscript x is used herein to indicate any CPU which is receiving an XI signal.

The CORn (castout) register 1n represents ones of plural castout request registers that receives a current castout request for L2. The subscript n indicates the assigned register of the plural castout registers assigned by an LRU replacement circuit for L2 (not shown) to receive the castout address. Replacement of the content of an L2 entry may done in the conventional manner when a CPU request does not hit (i.e. misses) in the L2 directory.

The IOy register 1y represents any of plural registers that is selected by the L2 priority as its current request to the L2 directory. Only I/O requests that hit in L2 are used by this embodiment; an I/O request that does not hit (i.e. misses in the L2 directory) is not fetched into L2, but is then accessed in the L3 main memory in the conventional manner.

Whichever of the registers 1z, 1n or 1y is currently selected has its address provided to comparators 28. And all addresses in stack 27 are provided in parallel to comparison circuits 28 which simultaneously compare all contained stack command addresses with the currently selected request address CPz, CORn or IOy being provided to the L2 cache.

An access 2 in the SCE tests the value of the CPID field in the currently accessed L2 directory entry in the detailed embodiment. If circuit 2 detects the tested CPID value is in the range of 1-6, it indicates an EX ownership by the identified CPU. But if the tested CPID is zero, access 2 has detected a public RO ownership for the data unit represented by currently selected L2 entry.

If exclusive ownership is detected by access 2, it invokes the generation of a specific cross-invalidate (XI) signal which is sent only to the one CPx identified by the tested CPID. A detected CPID value of from 1 to 6 in this embodiment indicates the one CPU in the system having exclusive ownership of the data unit associated with the currently selected L2 directory entry. A detected value of zero for the CPID indicates that data unit has public ownership and is therefore is readonly.

The specific XI signal initiated by access 2 is sent only to the CPU identified by the CPID in the L2 directory entry. The specific XI signal includes the main memory address (or a representation thereof) for the affected data unit in the receiving processor's cache, an XI type indicator (specific or general), and an identifier (ID TAG) for this L2 request command (requestor) so that the SCE can determine which requestor is responsible for a received XI response. The specific XI type indicator also indicates whether the addressed data unit is to be invalidated or changed to public ownership. In the SCE, the sending of a specific XI signal sets an "XI response wait mode" latch 8 to "XI wait mode". The XI wait cause by a specific XI signal is ended when the SCE receives the XI response from the XI requestor that sent the XI signal getting the XI response.

A general XI signal is detected by all CPUs except the requesting CPU and is put into all of their respective XI queues. A general XI signal is sent to all CPUs except the requesting CPU and the receiving CPU only invalidates if it has the addressed data unit, and does not provide any XI response. A XI signal received by any CPx causes a termination in the generation of any store commands by CPx, and the execution of any current instruction is suppressed and will need to be re-executed when processing of the XI signal by CPx is completed. Circuit 21 gates the invalidation address with the XI signal to a compare circuit 22 that compares the XI invalidation address in parallel with all addresses currently in the CPx store queue 26 and generates a compare or no compare signal. The XI invalidation address is used to invalidate any entry in the CPx L1 cache equal to the XI invalidation address.

If circuit 22 provides a compare signal, it activates a "send store" circuit 23 to mark any store command to the invalidate address in store queue 26, which then activates an "XI response circuit" 24 to send an XI response signal to the SCE where it resets the "XI response wait mode" latch 8 to terminate the XI wait mode in the SCE.

But if circuit 22 provides a no compare signal on its output G, it indicates there are no store commands in queue 26 for the invalidated address, and output signal G activates "XI response" circuit 24 to send the XI response signal to the SCE where it resets the "XI response wait mode" latch 8 to terminate the XI wait mode in the SCE.

The reset of wait mode circuit 8 causes it to output a wait mode termination signal which gates comparator 28 to compare the current L2 request address with all addresses currently in the the CPx store stack 27 using a single cycle parallel compare operation. A compare-equal (cmpr) signal from circuit 28 to an AND gate 29 inputs the content of an INPTR register into a capture INPTR register 15 that captures the current location in stack 27 available for an input of a current CPU store command. The captured INPTR value indicates the last location in the CPx stack 27 which may contain the last store command from CPx, and the OUTPTR register value indicates the CPz location having the oldest store command from CPz in the stack. The OUTPTR value is being incremented to continuously output its store command entries to update the L2 cache entries. The incrementing of OUTPTR will cause its contained pointer address to wrap around and finally become equal to the captured INPTR value.

The captured INPTR value is provided to a pointer comparison circuit 15 which compares it with the incremented stack OUTPTR value as the OUTPTR is incremented to output the store commands to the L2 cache. As long as the OUTPTR does not compare equal with the INPTR, a output signal D is provided from pointer compare circuit 15 to set the "store done mode" latch 13 to indicate that the store stack outputting is not yet done. When the OUTPTR finally compares equal with the INPTR, a output signal E is provided from circuit 15 to reset the "store done mode" latch 13 to indicate that all possible store commands have been outputted from stack 27 into the cache.

A current CPU request from CPz may be requesting exclusive ownership when access 2 has found public ownership exists for the currently accessed L2 entry. A current CPz request is detected by box 4 to determine if it wants exclusive or public ownership. If CPz request wants exclusive ownership, then special XI signalling is required, which in CPz specifically sets to exclusive ownership state an EX bit in its valid L1 directory entry at the XI address and generally invalidates the XI address in other all CPUs.

All IOy requests are handled by access 2 merely sending a general XI invalidate signal, which prevents any CPU from interfering with any I/O access in the L2 cache.

Thus, the general XI signal from access 2 is used when there there is no need for any XI response from any of the plural CPUs which may contain the data unit, since none can be doing store commands and all that is needed is L1 invalidation.

If a "no compare" output should be provided by stack compare circuits 28 (indicating no store commands from CPx exist in the stack) or the public ownership RO indication 6 exists from circuit 2 in the currently accessed L2 directory entry, the access operations represented by boxes 7, 16 and 20 are used. In all of these cases, there are no outstanding stores because the public ownership of the current data unit prevents stores from happening.

The change field in an accessed public entry is detected only for a CORn request because it is needed for castout control. For CPz and IOy requests, no castout is done but instead the accessed entry is transferred to CPz and IOy requests regardless of the state of the change field which therefore is not detected. Hence, change access circuit 7 detects the change field in the current directory entry only for a CORn request access 7 it is not used for a CPz or IOy request.

But if for a CORn request, access 7 finds the change field indicates no change, then there is no need for a castout (since the data unit is the same in main memory L3), and the directory entry update means 20 can immediately update the directory entry by overlaying its content with information from the CPz request that caused the respective CORn request.

Thus, for a CORn request, if access 7 detects the change bit is set on in the current directory entry, data unit access 16 is needed to access the updated associated data unit from the cache data arrays for the request, i.e. a switch 17 sends the data unit (castout) to the next storage level L3. For a CPz or IOy request, access 16 can immediately obtain the associated data unit from the cache data arrays for the request, i.e. a switch 18 sends the data unit to CPz for a CPU request, or and switch 19 sends the data unit to the requesting channel IOy.

Directory entry update means 20 is immediately used for a CORn request that finds no change in the associated data unit. But if the directory entry update means 20 is being used for a CPz request, then the update of directory entry content by means 20 is delayed until after the castout has been completed (for system recovery reasons the initial content of the entry may be needed if a system failure should occur before the castout is completed).

The timing delay for the cache data access 16 is controlled by the output F from the "store done" latch 13 when it is reset by a compare-equal signal E from a PTR compare circuit 15 (when the INPTR and OUTPTR are equal). All CPz store command entries to the requested data unit in stack 27 will have been flushed out to the cache when circuit 27 signals its output signal E, since then the OUTPTR will have revolved back to the captured INPTR starting point for the stack output operation, and then cache data access 16 may be initiated.

Flow Diagram FIGS. 7 and 8

A requesting CPU indicates in each of its fetch commands whether it is a fetch request for an exclusive fetch, a readonly fetch, or a conditionally-exclusive fetch. The L1 and XI directories handle each request in a manner dependent on which of these types of fetch commands is being provided by any requesting CPU. An exclusive fetch provides the requested data unit in the processor's L1 cache with exclusive ownership. A readonly fetch provides the requested data unit in the processor's L1 cache with public ownership. A conditionally-exclusive fetch provides the requested data unit in the processor's L1 cache with either exclusive or public ownership depending on conditions existing at the time of the request.

Several philosophical differences exists between the embodiments in FIGS. 7 and 8. One is in their different CPID field representations. In FIGS. 7 the bits in the CPID field represent a single value, which specifically represents the CPU exclusively owning the associated data unit or represents the general public ownership of the associated data unit. In FIGS. 8 the bits in the CPID field each respectively represent both the exclusive and public ownership by a specific CPU of the associated data unit. The result of this distinction is that the embodiment in FIGS. 8 does not use any general XI signal, since the specific ownership of every CPU in the system is known for all public ownership of any data unit as well as its exclusive ownership. The embodiment in FIGS. 7 requires the use of general XI signalling because of the limitation in its CPID value field of only being able to identify one CPU, which is sufficient for identifying exclusive CPU ownership, but is insufficient for identifying public ownership of any data unit which can simultaneously be owned by more than one CPU.

A consequence of all "XI signalling" is that it disrupts the operation of its receiving CPU, but it is essential to each CPU that has a copy of the XI addressed data unit in its L1 cache to maintain data coherence in the system. The most efficient XI signalling is accomplished by the "specific XI signalling" in the embodiment in FIGS. 8. The disadvantage of the "general XI signalling" found in the embodiment of FIGS. 7 is that it disrupts the operation of CPUs that do not have the addressed data unit and therefore should not be affected by XI signalling. Frequently, more CPUs in a system do not have the XI addressed data unit than have the XI addressed data unit.

The flow diagrams in FIGS. 7A-7D and FIGS. 8A-8E apply to the systems shown in FIGS. 1, 9 and 11 for the different types of CPU fetch requests that have misses in the L1 cache. The flow diagrams in FIGS. 8A-8D include features additional to those used in FIGS. 7A-7D for handling similar types of fetch requests. These flow diagrams are largely self explanatory in view of the background described herein. Each of FIGS. 7A-7D and 8A-8C, respectively, initiates its fetch request by entering A box 301 or 401 that represent the processing step of determining if the request had an XI directory hit or miss in the accessed XI directory entry (accessed using the current request's address, and referred to as the "accessed entry"). A hit occurs when the an equal condition is found both between the processor requested address and the address in the accessed entry, and between the processor requested ownership and the ownership indicated in the accessed entry. A hit causes the left path from step 301 or 401 to be taken, and a miss causes the right path from step 301 or 401 to be taken. The hit path is significantly different among these flow charts; the miss path is similar in these flow charts.

Another philosophy used in the process of FIGS. 7 does not require all data units valid in the L1 directory also be valid in the L2 cache directory. The different philosophy used in the flow diagrams of FIGS. 8 requires that all data units valid in the L1 directory also be valid in the L2 cache directory (the XI directory). The embodiment of FIGS. 7 has the advantage of allowing continued fetching (but no storing) of the LRU L1 data unit by the CPUs, but has the disadvantage of a subsequent exclusive fetch request for that data unit requiring a general XI to all CPUs (and the resulting overhead) which must be performed before any store can be done. Although the embodiment of FIGS. 8 has the disadvantage of not allowing continued fetching of the LRU L1 data unit by the CPUs, it has the advantage of not requiring any XI signalling (and the resulting overhead) for a subsequent exclusive fetch request for that data unit, since any data unit not represented in the XI directory is therefore not in any L1 cache.

Exclusive Fetching

Figure 7A:
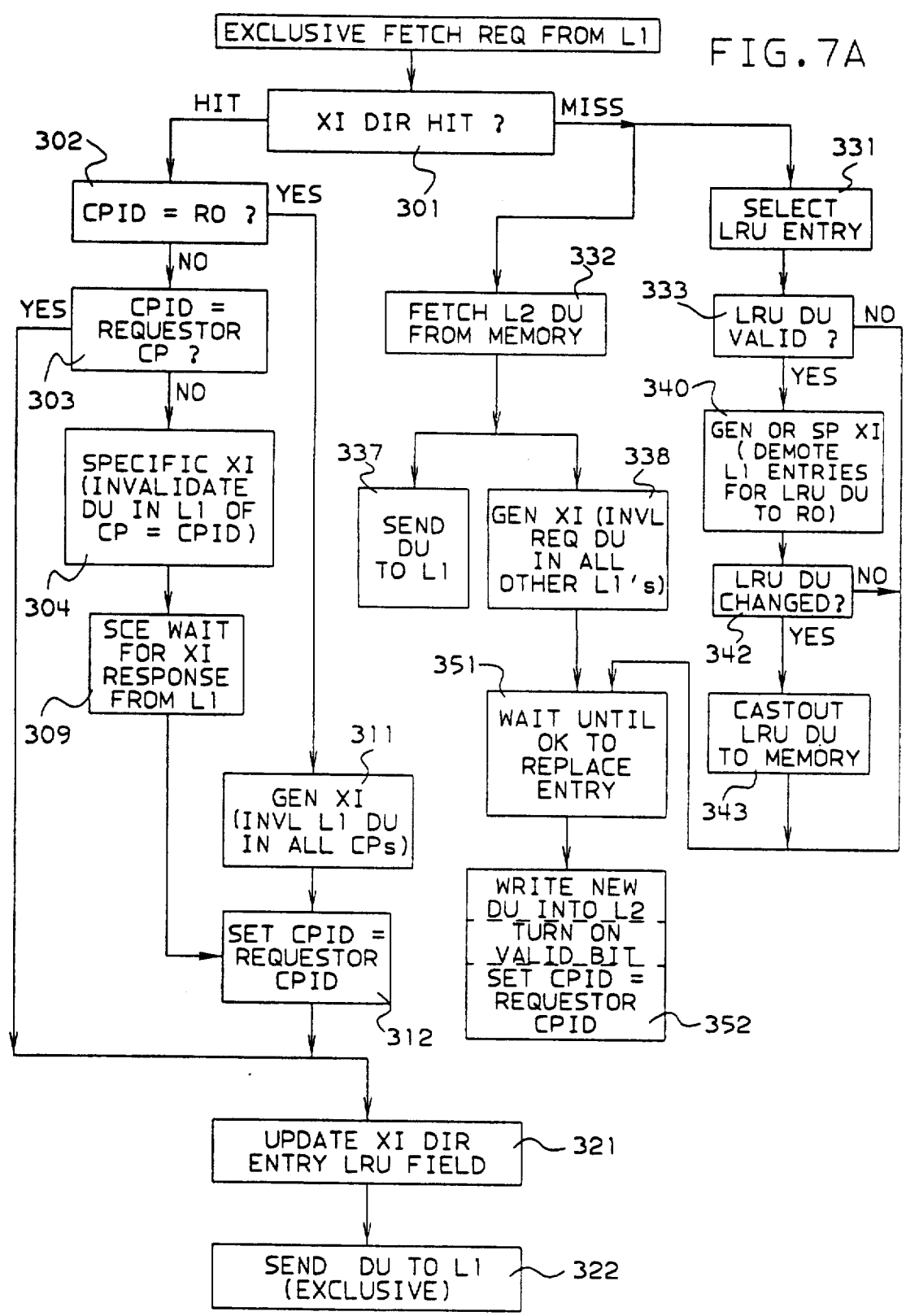
Figure 8A:
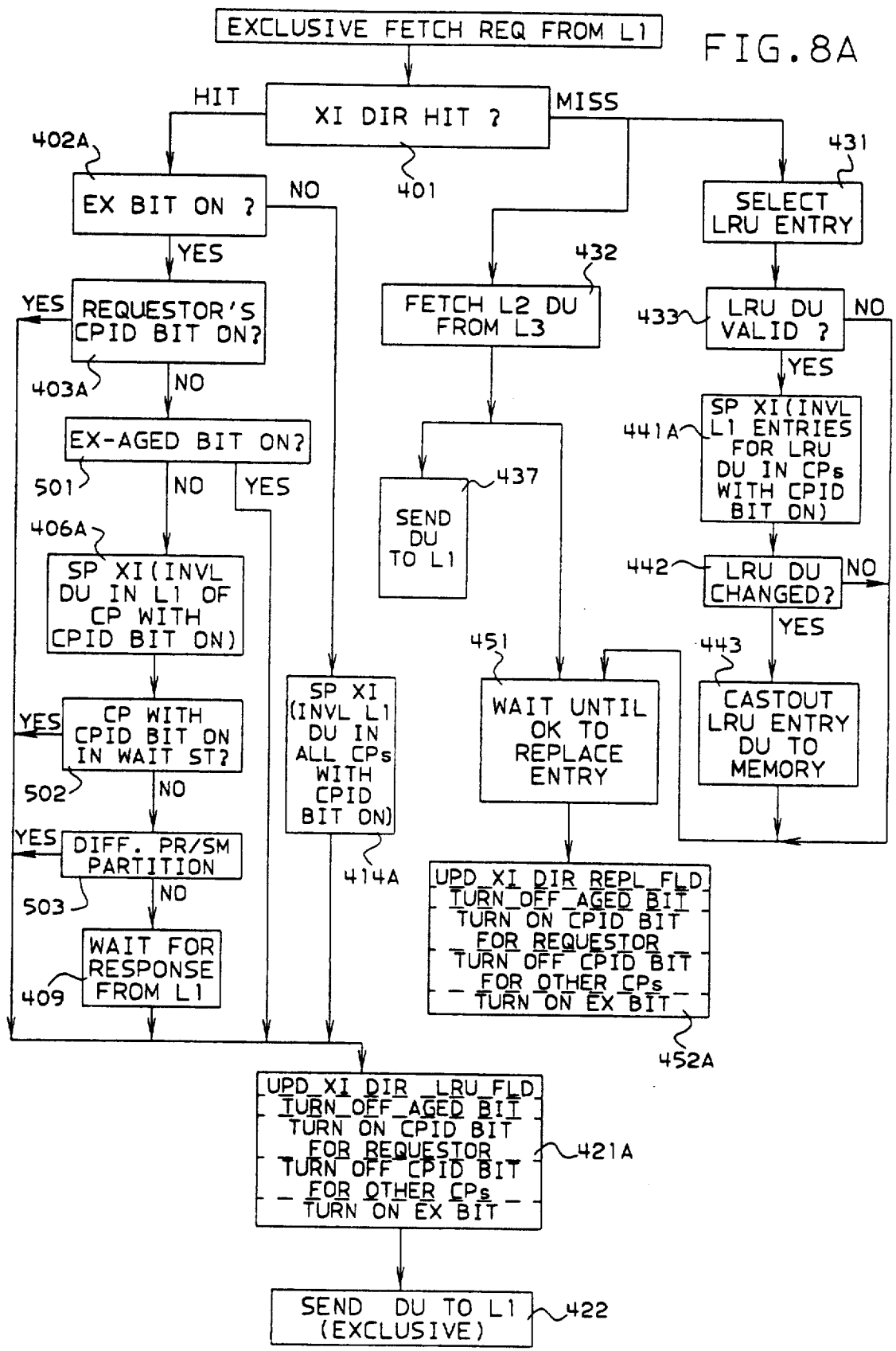

FIGS. 7A and 8A each represent the operational steps for performing an exclusive fetch request to the XI directory in FIGS. 1 or 11 which use the XI directory also as an L2 cache. An exclusive fetch is a fetch request for giving the requesting processor exclusive ownership of a data unit, which is done when the processor knows the fetched data unit will be stored into, such as a fetch request for accessing a data unit for a sink operand.

The hit path is entered at step 302 if step 301 finds a hit entry to be accessed. Or the miss path is entered at step 331 and step 332 if step 301 does not find any entry in the XI directory. Then step 331 activates the entry replacement means for the XI directory entry to assign the current LRU entry in the set-associative row being addressed by the current request; and step 332 accesses the L3 main memory to fetch the requested data unit.

In the hit path in FIG. 7A, step 302 tests the CPID field in the accessed entry to determine if it indicates the public (RO) state. For example, the CPID field may have three bits representing eight different values, 0-7. Value 0 may be used to indicate public (RO) ownership, and values 1-7 may be used to represent exclusive (EX) ownership by respective CPUs 1-7 in a system of 7 CPUs. If the tested CPID value is 0, then the yes (Y) exit is taken from step 302 to step 311 which represents that a general XI signal is generated in the SCE and sent on all XI buses 212 in FIG. 6 to the XI queue in every CPU in the system to invalidate any XI addressed data unit found in any L1 cache.

Then step 312 sets the CPID field in the accessed XI directory entry to the requestor's CPID value to indicate the requestor's ownership of the associated data unit.

Step 321 updates the XI directory replacement means for selecting the next assignable entry in the accessed row in the XI directory. And step 322 returns the fetched data unit from L3 main memory to the requesting L1 and L2 caches. The exclusive fetch operation is then completed.

But if the value is any of 1-7 in the accessed CPID field, then another CPU may have exclusive ownership of the requested data unit. The no (N) exit is taken from step 302 to step 303 to test if the CPID is the requestor's value. In this embodiment, the size of a data unit in the L1 cache is a sub-multiple of the size of the data unit in either the L3 main memory or the L2 cache. But CPID in the associated XI directory entry indicates the CPU of that L1 cache is the owner of all sub-multiples of that data unit. Then if an L1 cache miss occurs and step 303 finds the requestor's CPID is in the accessed XI entry, it is accordingly determined that the requesting processor already exclusively owns the data unit but it does not have the requested sub-multiple of the L3/L2 data unit in its L1 cache. No change of ownership is therefore needed in this case, so step 321 is entered to update the replacement controls for the addressed row, and step 322 returns the required sub-multiple of the data unit from the L2 cache entry to the requesting L1 cache.

But if step 303 finds the accessed CPID field has a value 1-7 which is not equal to the requestor's CPID value, then another CPU has exclusive ownership of the requested data unit. Here step 303 determines that an XI conflict exists between the requestor and another CPU which currently owns the data unit. The no (N) exit is taken from step 303 to step 304 for which the SCE issues a specific XI signal that is sent only on one of the XI buses 212 to the identified CPU where it is put into the CPU's XI queue for invalidating the XI addressed data unit in its L1 cache.

While the conflicting CPU (the CPID CPU) is processing the specific XI request, step 309 is indicating the SCE is waiting for an XI response signal from the conflicting CPU that the invalidation has occurred and the conflict no longer exists.

Then step 312 updates the directory entry by setting its CPID ownership field to the value of the requesting CPU. And step 321 updates the XI directory replacement means to reflect the current access to the XI entry, and step 322 then accesses the requested L1 sub-multiple of the L2 data unit in the L2 cache and sends it in the L1 cache of the requesting CPU. The exclusive fetch operation is then completed.

The miss path in FIG. 7A involves executing steps 331 and 332 simultaneously. After step 332 selects an entry in the XI directory for the current request, step 333 is entered to test the state of the valid bit in the replacement assigned LRU entry to determine if further checking of its content is necessary. If the content has its valid bit set to invalid state, then step 333 takes its no exit to step 351 since an invalid content in the assigned LRU entry can be immediately replaced to represent the current request to the XI directory.

Although step 351 is entered to wait until the LRU content can be replaced, it can be done immediately when it is entered from step 333 indicating the LRU entry content is invalid.

But if step 333 finds the content of the LRU XI entry is valid, its content represents the associated LRU data unit which which could have a copy in another processor's L1 cache as either EX or RO, which is indicated by the value of the CPID in the LRU entry. (It is to be noted that the LRU data unit is a different data unit than the requested data unit, and they should not be confused.)

Step 340 is then entered from the yes exit of step 333 to test the LRU CPID field. And step 340 sends an appropriate XI signal, specific XI or general XI. A specific XI signal is sent to the exclusively owning CPU indicated by a non-zero CPID found in the LRU entry. A general XI is sent to all CPUs when a zero CPID is found in the LRU entry (then any number of CPUs could have an RO (public) copy of the LRU data unit). The demotion to RO of the LRU data unit allows this data unit to remain in the L1 caches while the LRU data unit after the LRU data unit is replaced in the L2 cache by later step 352. This philosophy used in the process of FIGS. 7A-D does not require all data units valid in the L1 directory to also be valid in the L2 cache directory. The different philosophy used in the flow diagrams of FIGS. 8A-E requires that all data units valid in the L1 directory also be valid in the L2 cache directory (the XI directory). The embodiment of FIGS. 7 has the advantage of allowing continued fetching (but no storing) of the LRU L1 data unit by the CPUs, but has the disadvantage of a subsequent exclusive fetch request for that data unit requiring a general XI to all CPUs (and the resulting overhead) which must be performed before any store can be done. Although the embodiment of FIGS. 8 has the disadvantage of not allowing continued fetching of the LRU L1 data unit by the CPUs, it has the advantage of not requiring any XI signalling (and the resulting overhead) for a subsequent exclusive fetch request for that data unit, since the data unit is not in L2 and therefore is not in any L1 cache.

Step 342 next checks the state of a change flag bit in the LRU XI entry to determine if the associated LRU data unit has been changed or not. If not changed, the data unit currently has an exact copy in the L3 main memory and no castout is needed, so the no exit from step 342 is taken to step 351 which finds the LRU entry can be immediately replaced, so that step 352 is immediately entered and executed.

But if step 342 finds the LRU change bit is on, then the yes exit is taken to step 343 to perform the castout of the LRU entry from the L2 cache to the L3 memory, since the associated data unit is the only updated version which must be castout to the L3 main memory before the LRU entry content can be destroyed by overlaying it with information for the currently requested data unit.

Step 351 then holds up the writing of information for the new request in the LRU XI entry until the LRU information is no longer needed for a potential recovery action should any failure occur in the castout operation. Finally, step 352 is executed in which the XI directory entry for the requested data unit is written into the LRU entry (overlaying the prior entry), the fetched data unit is stored into the L2 cache, the CPID value of the new requestor's CPU is written into the LRU XI entry, and the valid bit is turned on to validate the new request's entries in the XI directory and in the L1 cache entry.

The XI miss signalled by step 301 indicates the requested data unit is not represented in the XI directory and therefore does not have its ownership represented by any CPU (and accordingly is not in the L2 cache in this embodiment). The parallel path through step 332 performs the fetch from the L3 memory of the requested data unit and other operations in parallel with the execution of the path through step 331. Thus, step 332 sends the request to the L3 main memory for fetching, while step 338 generates a general XI signal to all other CPUs to invalidate any copy of the requested data unit in their L1 caches at the request's address. And steps 351 and 352 are executed to put the fetched data unit into the associated L2 cache entry and the request's entry in the XI directory is completed.

Step 337 operates as soon as the fetch occurs in L3 to transfer the requested sub-multiple of the data unit on a bypass bus from the L3 memory to the L1 cache of the requesting CPU in order to allow the CPU to begin using the requested data as soon as possible.

The exclusive fetch steps in the embodiment of FIG. 8A is similar but not the same as in the embodiment of FIG. 7A. Their primary differences are caused by the previously-mentioned different philosophy used in the flow diagrams of FIGS. 8A-E which requires that all data units valid in the L1 directory also be valid in the L2 cache directory (the XI directory). This philosophy requires that a data unit invalidated in L2 must also be invalidated in all L1 directories. It would violate this philosophy in FIG. 8A to change a data unit to RO in L1 and invalidated it in L2 as is done in FIG. 7A.

The reference numbers used in FIG. 8A all begin with the digit 4, while reference numbers used in FIG. 8A all begin with the digit 3. If the right-most two digits in the reference number are the same in FIGS. 7A and 8A, then the step operates the same in FIGS. 7A and 8A. But if the right-most two digits in the reference number are the same in FIGS. 7A and 8A but they are followed by a letter, a philosophical difference applies.

Accordingly, step 441A in FIG. 8A invalidates all copies of the LRU data unit in the L1 directories, while step 441 in FIG. 7A demotes the data unit to readonly, when in both FIGUREs these steps are followed by removal of the LRU data unit from L2 (which is the result of invalidation).

FIG. 8A has no equivalent of step 338 in the L2 miss path in FIG. 7A. In FIG. 8A an L2 miss of a data unit assures it is not available in L2, which further assures that no L1 directory has any part of the data unit under the philosophy in FIG. 8A.

The hit path in FIG. 8A is similar to the hit path in FIG. 7A except that new features are provided in FIGS. 8 that are not found in FIGS. 7. They include the use of an exclusive-aged flag bit (aged bit) in the hit XI directory entry (by step 501), and the use of the wait state bit for the requesting CPU (by step 502).

Thus, the hit path begins with step 402A which tests the state of the EX/RO bit in the accessed XI entry.

If step 402A finds the tested EX/RO bit is in EX state in the accessed XI entry, the yes exit is taken to step 403A. Step 403A accesses and tests the identification bit assigned to the requesting CPU in the CPID field of the accessed XI entry. If the requesting CPU's CPID bit is off, then the requesting processor does not have any part of the requested data unit in its L1 cache, and the no exit is taken to step 501 to test the state of the EX-aged bit field in the accessed XI directory entry. If the aged bit is found on, it indicates no processor currently has the associated data unit in its L1 cache, and that the requesting processor can obtain the data unit without any XI signalling overhead. Then step 421A is entered to turn off the aged bit, update the XI directory replacement means for this access, turn on the CPID bit for the requesting CPU, turn off the CPID bit for each other CPU, and set the EX/RO bit to EX state in the accessed XI directory entry. Then step 422 sends the requested sub-multiple of the data unit to the L1 cache of the requesting CPU.

Figure 8B:
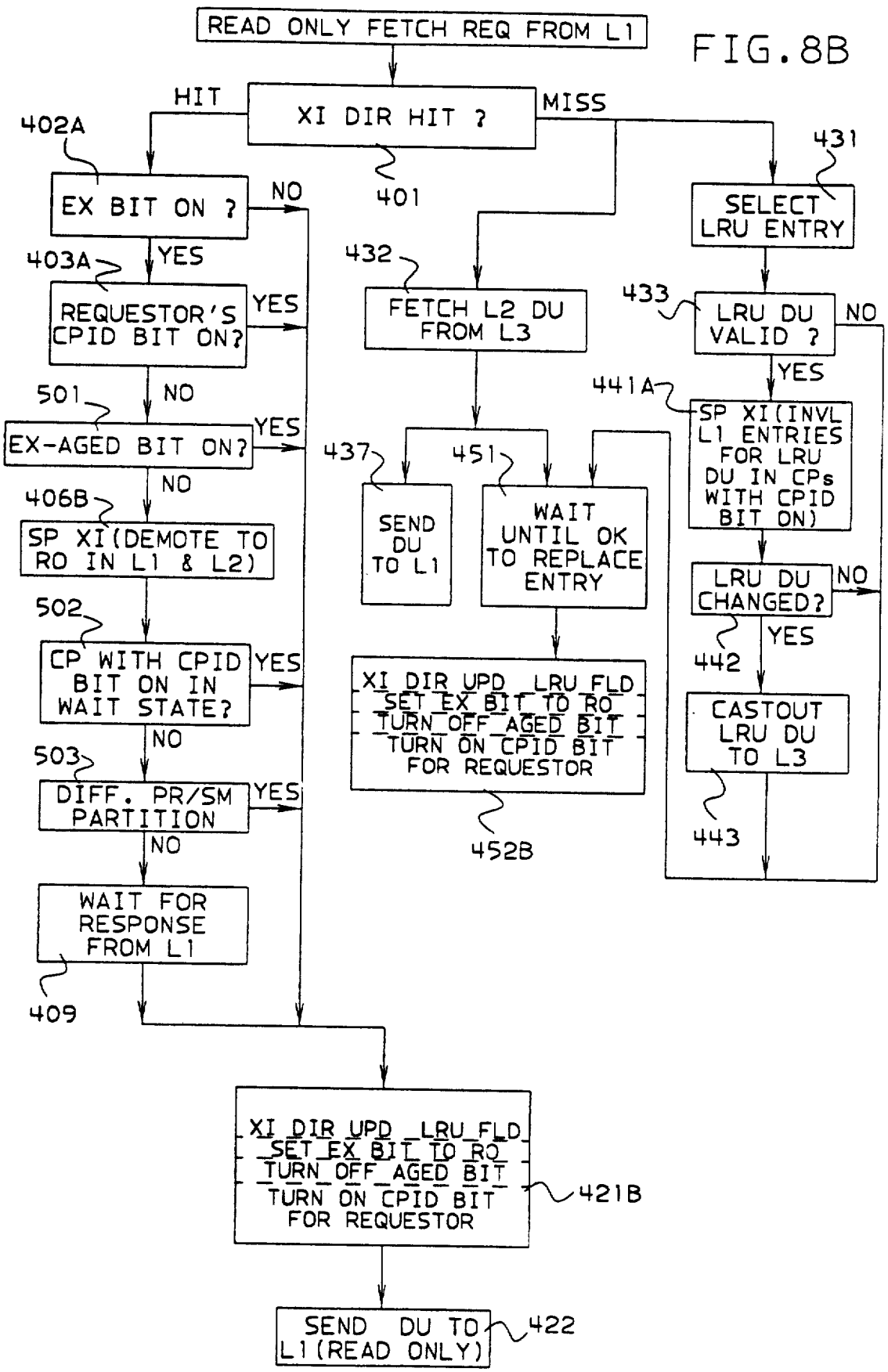
Figure 8D:
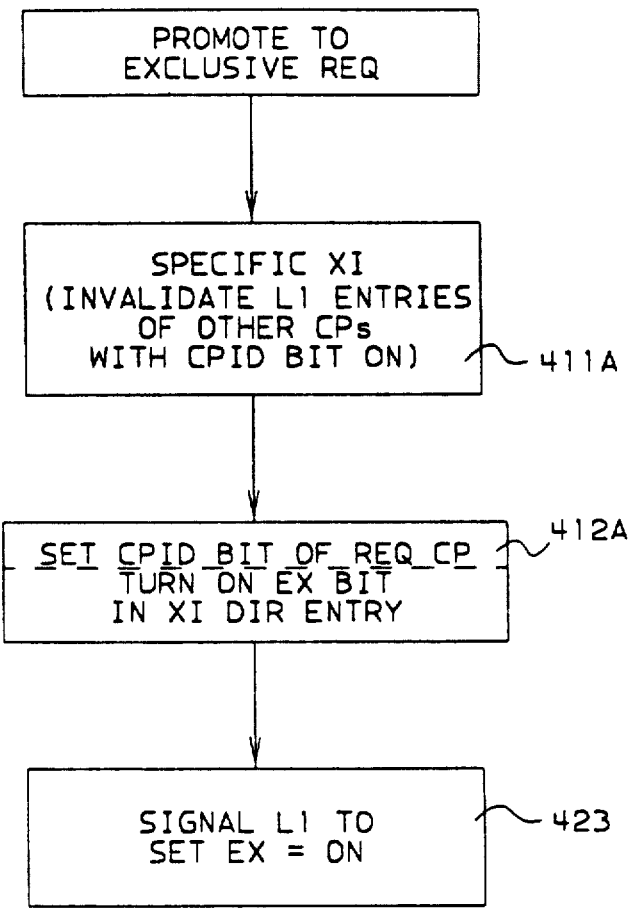
Figure 8E:
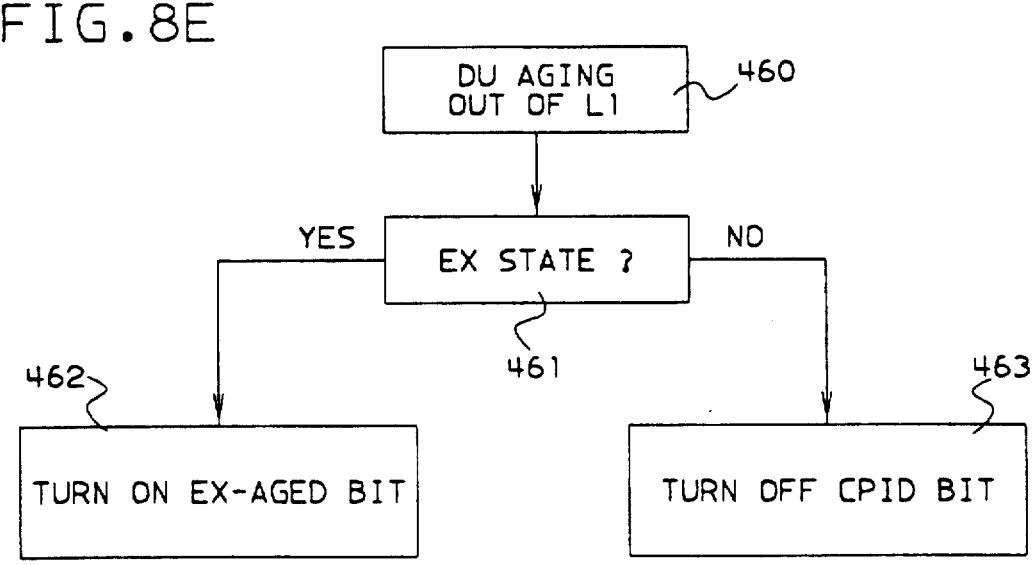

FIG. 8E describes the process of setting the EX-aged flag bit in an XI directory entry. The initial step 460 represents a signalling operation by the L1 directory entry replacement means that signals (to EX-aged controls associated with the XI directory) the address of a data unit being aged out of (and may be replaced in) the L1 cache. Step 461 is the detection by the EX-aged controls in the addressed data unit of the state existing for its EX/RO bit. If the EX-aged controls find the public (RO) state exists for the addressed XI entry, the no exit is taken from step 461 to step 463. Step 463 represents the controls turning off the CPID bit for the CPU having signalled the aging out, so that the CPID field indicates that CPU L1 cache no longer has the addressed data unit.

If the EX-aged controls find the exclusive state exists, the yes exit is taken from step 461 to step 462. Step 462 has the EX-aged controls turn on the aged bit in the addressed XI entry when the EX on state is found in that entry, and the CPID bit is left on. Thus, when the EX-aged bit is turned on, the CPID bit for the aged-out CPU remains on, and it is not turned off until another CPU's L1 cache fetches the L2 data unit, or one of its submultiples.

Step 460 indicates when all parts (submultiples) are no longer available in the L1 cache after any submultiple ages out of the L1 cache, whether the data unit was exclusively or publically owned. If an exclusively-owned data unit is aged out of any private L1 CPU cache and it has a submultiple of its L2 data unit left in the L1 cache, neither the L1 or L2 data unit is available for accessing by any other CPU. If an aged-out submultiple data unit is publically owned, and it has a submultiple of an L2 data unit left in the L1 cache, the CPID bit is not turned off in step 463. For example, upon the aging-out of an exclusive submultiple, and if any other submultiple remains in the same L1 cache, the L2 data unit and any remaining submultiple(s) in L1 can be changed to public ownership (i.e. RO) or they can be invalidated, because the aging-out process makes unlikely the possibility of any other submultiple being accessed.

A way to control the process described above is to check the L1 cache for any other submultiple of the same L2 data unit by doing a search for any other submultiple using the L2 data unit address. Still another way is to have the L2 controls send an invalidate signal(s) that addresses all possible submultiple(s) in that L1 cache.

If step 402A indicates the EX/RO bit indicates an RO (public) state in the accessed XI directory entry, then other CPUs may have a copy of any parts of the data unit, and the no exit is taken to step 414A. Step 414A tests the other bits in the CPID field (for the other CPUs) to determine which, if any, of other CPUs have a copy of the public data unit, and a specific XI signal is sent only to each CPU having a CPID bit detected in an on state. Then steps 421A and 422 are entered to do their operations (described in the prior paragraph). Step 421 can be executed without waiting for the XI response signal resulting from the specific XI signal previously sent to another CPU by step 414A.

If step 403A is entered and finds the requestor's CPID bit is on, the requestor has a sub-multiple of the requested data unit but it is not the sub-multiple being currently requested since the current request to the XI directory would not have been made if the requested sub-multiple is in the requestor's L1 cache. Then no XI signalling overhead is needed, and the yes exit is taken to steps 421A and 422, which do their operations as described in the prior paragraph.

But if step 501 is entered and finds the aged bit is off in the accessed XI directory entry, then another CPU may have the requested data unit in its L1 cache, and the no exit is taken to step 406A. Step 406A operates like step 414A to test the CPID field but will find only one bit on for another CPU since steps 402A and 403A indicate another CPU has EX ownership. Step 406A sends a specific XI signal to the other CPU (indicated by the on bit in the CPID field) to invalidate its copy of the requested data unit. And step 502 is entered.

Step 502 tests the state of the "wait state bit" for the requesting CPU. Each CPU has a wait state bit associated with the XI directory controls, and each CPU sets and resets its respective wait state bit to indicate whether the CPU is in wait state or operating state. A CPU in wait state has no need for having data units with either exclusive or public ownership, except in so far as having a data unit saves refetching it when the CPU later goes out of wait state into operating state. It has been found that CPUs often spend a significant amount of time in wait state.

This invention has discovered that a requesting CPU can obtain a data unit owned exclusively by another CPU in wait state without waiting for the XI response signal resulting from the specific XI signal previously sent to another CPU by step 406A. This is done by using the yes exit from step 502 to step 421A when the wait state bit is on for the CPU that received the XI signal.

If step 502 finds the wait state bit is off for the CPU that received the XI signal, the requesting CPU must enter step 409 to wait for the XI response signal resulting from the specific XI signal previously sent to another CPU by step 406A.

An operation somewhat similar to the wait state operation is also provided by this invention in regard to a CPU switching to a different PR/SM partition. PR/SM (processor resource/system management) is a commercial program which has been offered by the IBM Corporation for use on S/370 data processing system, which is described and claimed in U.S. Pat. No. 4,843,541 entitled "Logical Resource Partitioning of a Data Processing System". PR/SM divides the memory, I/O, and CPU resources of a data processing system into logical partitions which can respectively have their own operating system wherein an operating system executing in any partition cannot be interfered with by an operating system executing in any other partition. A CPU may be time shared among a plurality of logical partitions.

This invention has also discovered that a requesting CPU can shorten the time for obtaining a data unit owned exclusively by another CPU switched by PR/SM to a different logical partition. This is analogous to the shortened time obtained for getting a data unit owned exclusively by another CPU in wait state. In both of these cases, the requesting CPU can immediately obtain a data unit having XI signalling to an exclusively owning CPU without waiting for the XI response signal from that CPU. To do this, a set of partition indicator bits are required for each CPU in the system to indicate the current partition in which the CPU is assigned, which are represented by the PR/SM indicator bits in FIG. 6. For example, three bits may be assigned to each CPU in a system having up to seven partitions, and the binary coding of these three bits indicates one of seven as the current partition number, or indicates zero if no partition is currently assigned.

Each CPU has the responsibility of maintaining the correct code setting the states of its respective three PR/SM bits, just as it must maintain the setting of its respective wait state bit.

Accordingly in FIG. 8A, when a CPU in a PR/SM system performs step 502 to test if the wait state bit is on for another CPU receiving an XI signal (identified by the on-state CPID bit), the CPU will also perform step 503 if the XI receiving CPU is not in wait state. Step 503 tests of the XI receiving CPU is in a different PR/SM partition than the requesting CPU. If the XI receiving CPU is in a different partition, the requesting CPU can immediately get the use of the requested data without waiting for the XI receiving CPU to send an XI response signal.

Readonly Fetching

Figure 7B:
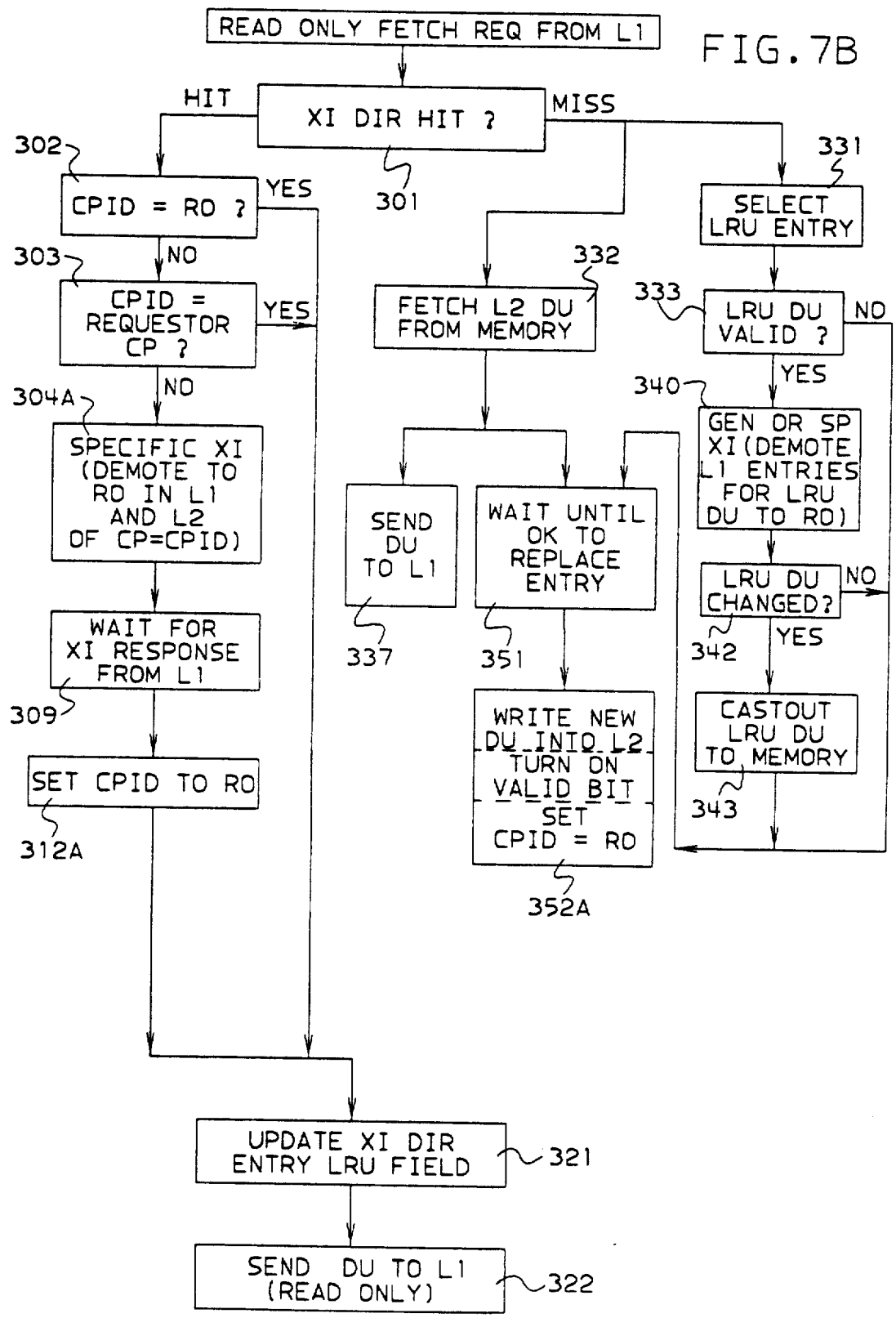

FIGS. 7B and 8B each represent the operational steps for performing a readonly fetch request to the XI directory in FIGS. 1 or 11 which use the XI directory also as an L2 cache. A readonly fetch is a fetch request for giving the requesting processor public ownership of a copy of the requested data unit. A readonly fetch is requested when a processor knows the requested data unit will not be stored into, such as a fetch request for accessing a source operand or for accessing a data unit in an address translation table.

The miss path in readonly-fetch case in FIG. 7B is essentially the same as the miss path described for the exclusive-fetch case in FIG. 7A, except step 352B is used instead of step 352A, and step 338 is not used. The difference between steps 352 and 352A is primarily in 352A in FIG. 7B sets the CPID field value to the public ownership value (zero), instead of step 352 in FIG. 7A which set this field to the CPID value for the requesting CPU to indicate its exclusive ownership. Step 338 is not used in FIG. 7B requested data unit was not found in the requestor's L1 cache and therefore need not be invalidated with an XI signal. (Note: If the requested data unit was owned exclusively by the requesting processor, the hit path is taken in which its L1 copy is demoted to public ownership by step 304A.)

The hit path described for the readonly-fetch case in FIG. 7B is also similar to the hit path described for the exclusive-fetch case in FIG. 7A, except for steps 304A and 312A are used instead of steps 304 and 312, and step 311 is not used in FIG. 7B. The difference between the specific XI steps 304 and 304A is that 304A does a demote to public ownership instead of a termination of ownership (i.e. invalidation) done by step 304. And step 312B sets the CPID value to the public CPID value of zero, instead of the step 312 operation for setting the CPID field to the requester's CPID value.

The elimination of step 311 in FIG. 7B is because any readonly copy of the requested data unit is left in each other CPU's L1 for the readonly fetch in FIG. 7B, while the exclusive-fetch in FIG. 7A needed to invalidate it.

The miss path for the readonly case in FIG. 8B is essentially the same as the miss path described for the exclusive-fetch case in FIG. 8A, except step 452B is used instead of step 452A. The difference between steps 452A and 452B is primarily in 452B in FIG. 8B resetting the EX/RO bit to indicate public ownership, instead of step 452A in FIG. 8A which set this bit to indicate exclusive ownership.

The hit path for the readonly-fetch case in FIG. 8B is also similar to the hit path described for the exclusive-fetch case in FIG. 8A, except for steps 406B being used instead of step 406A, and step 414A not being used in FIG. 8B. The difference between the specific XI steps 406A and 406B is that 406B does a demote to public ownership instead of a termination of ownership (i.e. demote to RO, instead of invalidation) in the L1 of the other CPU having EX ownership).

The elimination of step 414A in FIG. 8B is because a readonly copy of the requested data unit is left in each other CPU's L1 for the readonly fetch in FIG. 8B, the exclusive-fetch in FIG. 8A needed to invalidate it.

Conditionally-Public Fetching

FIGS. 7C and 8C each represent the operational steps for performing a conditionally-public (i.e. conditionally-readonly) request to the XI directory in FIG. 1 or 11. A conditionally-public fetch gives the requesting processor either readonly or exclusive ownership of a data unit depending on existing conditions which are indicated in the processes of FIGS. 7C and 8C, but is biased in favor of giving readonly ownership.

The miss path in conditionally-public case in FIG. 7C is the same as the miss path described for the exclusive-fetch case in FIG. 7A, in which the requested data unit is provided in the L1 cache with exclusive ownership.

The hit path described for the conditionally-public case in FIG. 7C is also similar to the hit path described for the readonly-fetch case in FIG. 7B, except for the yes exit from step 303 which does not change the currently existing exclusive ownership of the requesting CPU, and fetches into the requesting L1 cache a different sub-multiple of the data unit in the L2 cache with exclusive ownership.

The miss path for the conditionally-public case in FIG. 8C is the same as the miss path described for the exclusive-fetch case in FIG. 8A.

The hit path for the conditionally-public case in FIG. 8C is also similar to the hit path described for readonly-fetch case in FIG. 8B, except for the yes exits from steps 403B and 501. Neither step 403B or 501 in FIG. 8C changes the currently existing exclusive ownership of the requesting CPU, and fetches the requested sub-multiple into the requesting L1 cache with the exclusive ownership indicated for the corresponding L2 data unit.

Promote-to-Exclusive Ownership

Figure 7D:
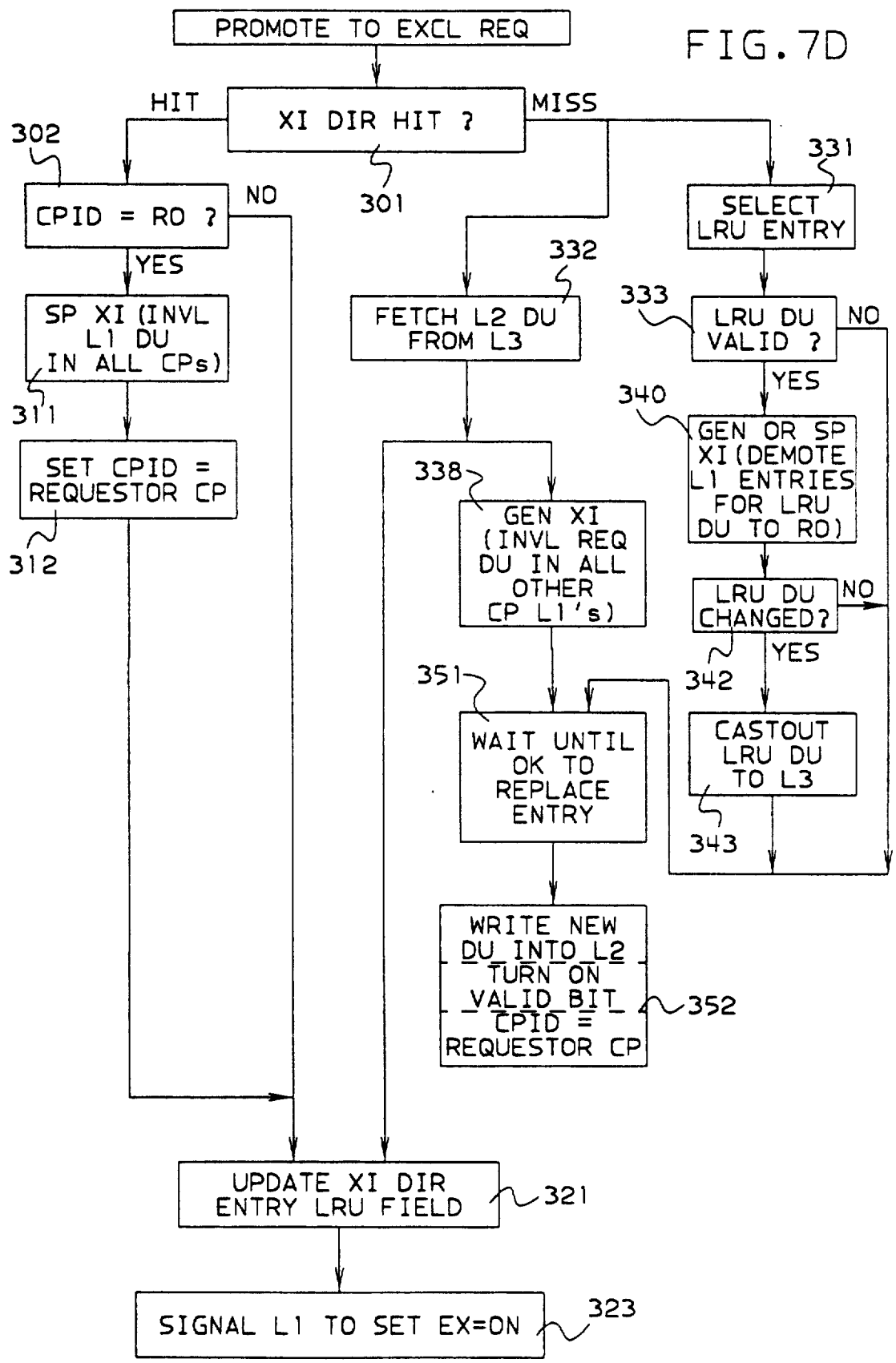

Any CPU having a data unit with public ownership in its L1 cache can issue a command to change its ownership to exclusive ownership. It is herein called a "promote to exclusive" command. FIGS. 7D and 8D each represent the operational steps used by a "promote to exclusive" command for the different embodiments of the invention described herein for changing the ownership of a data unit from readonly to exclusive in the XI directory in FIG. 1 or 11 and in the L1 cache of the requesting processor.

Because of the philosophy used in the embodiment of FIGS. 7A-D, it is possible for a requested data unit not to exist in the XI directory or in the L2 cache, even though it does exist in the L1 cache which may have a part (a sub-multiple) of the data unit. Therefore a "promote to exclusive" command can miss, as well as hit, in the XI directory in this embodiment. However in the embodiment of FIGS. 8A-E, a "promote to exclusive" command can not miss in the XI directory because its philosophy requires all valid L1 data units to exist in the XI directory and the L2 cache.

In FIG. 7D the miss path in promote-to-exclusive ownership case is similar to the miss path described for the exclusive-fetch case in FIG. 7A, except that there is no data unit sent to the L1 cache. Instead, steps 321 and 323 are entered from step 332, in which step 323 represents the sending by the XI directory controls of a confirmation signal to the requesting CPU to change its ownership indication field in its L1 cache directory to an EX indication, which signals the CPU that it can now use the data unit exclusively, and may now store into it.

The hit path described for the promote-to-exclusive ownership case in FIG. 7D uses step 302 to test the CPID value in the accessed XI directory entry. If the CPID field has its RO value, the yes exit to step 311 which sends a general XI signal to all CPUs, since any or all may have an RO copy in its L1 cache. No XI response is needed. Then step 312 sets the CPID value in the XI directory entry to the CPID value of the requesting CPU. Step 321 is entered from step 312, and then step 323 sends a confirmation signal to the requesting CPU to change its ownership indication field in its L1 cache directory to an EX indication, which indicates to the CPU that it can now exclusively use that data unit in its L1 cache.

In FIG. 8D, the processing for the "promote to exclusive" command is much simpler because the philosophy used in this embodiment does not allow for an XI directory "miss" to occur, as has been previously explained herein. Therefore the only path represented in FIG. 8D is the hit path, in which step 411A sends a specific XI signal only to each CPU having its CPID bit set on, since only those CPUs in the system can have a copy of the public data unit at issue. Then, step 412A sets on the CPID bit of the requesting CPU in the CPID field and sets on the EX/RO bit field to exclusive state in the accessed XI directory entry. Finally, step 423 signals the requesting CPU to set its L1 cache entry to EX state and that it can use this data unit exclusively.

Figure 12A:
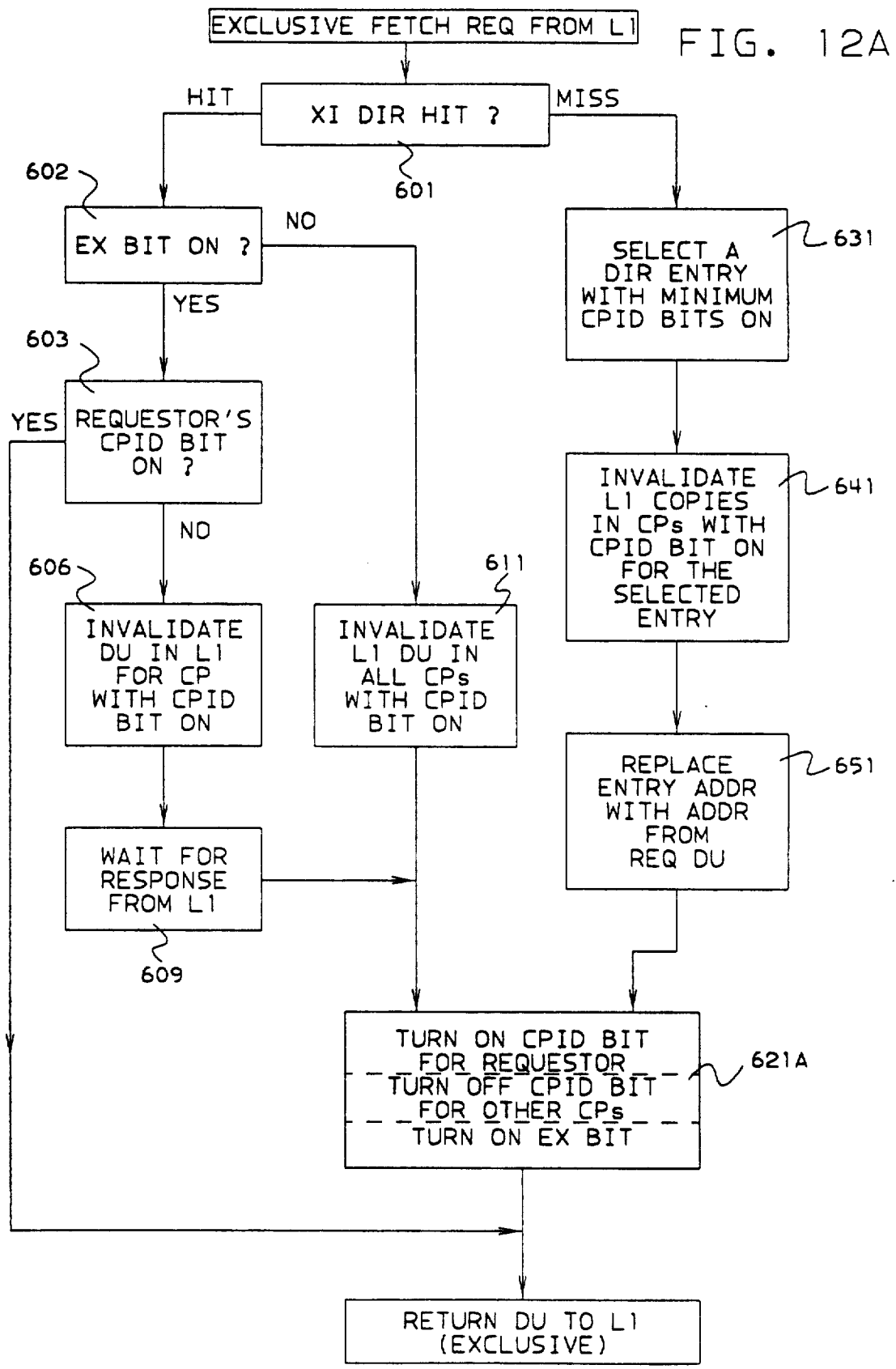
FIGS. 12A, 12B, 12C, 12D and 12E provide flow diagrams of a process that operates on the system shown in FIG. 9 for performing another embodiment of the invention.
Figure 12B:
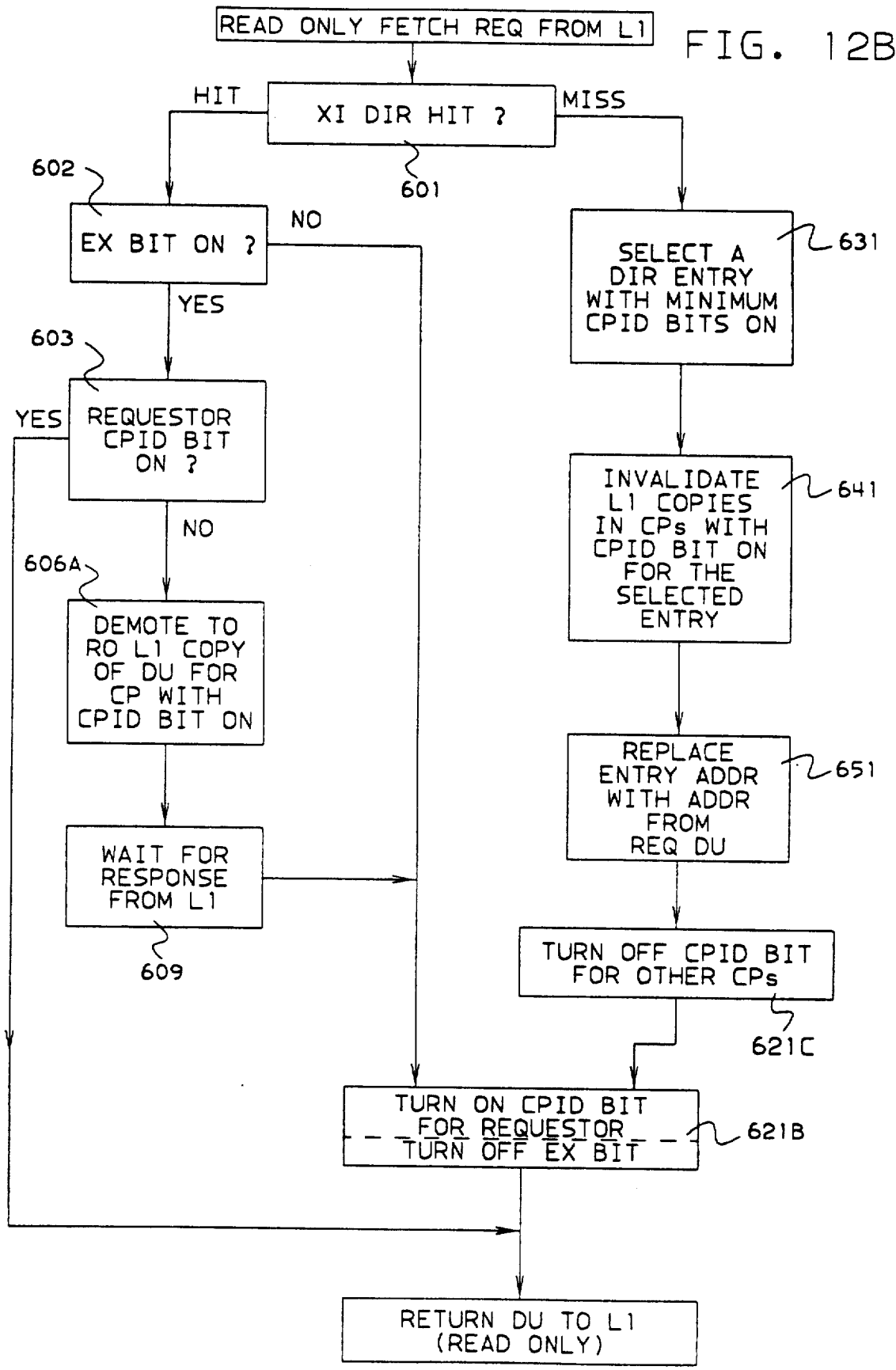
Figure 12C:
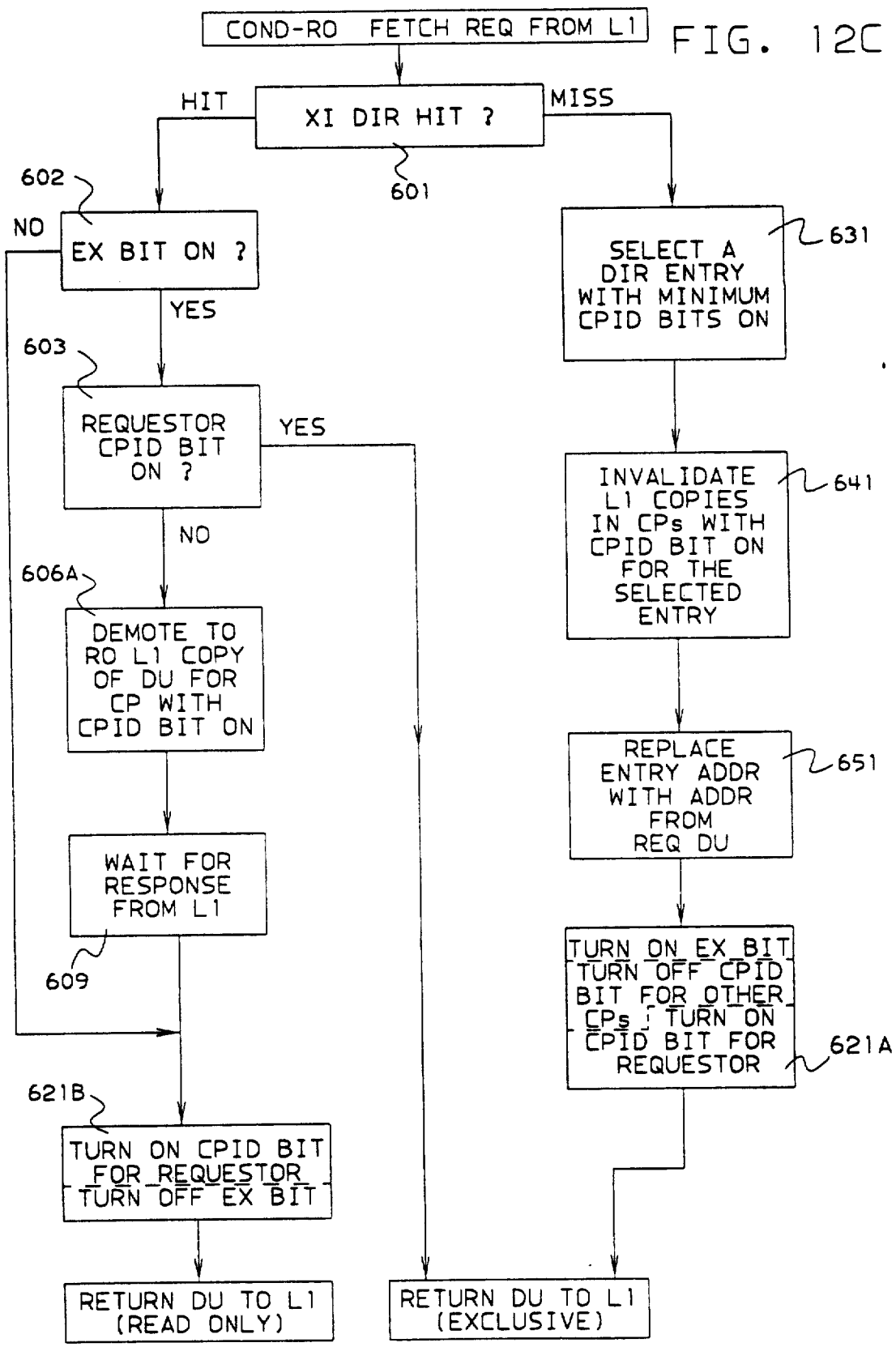
Figure 12D:
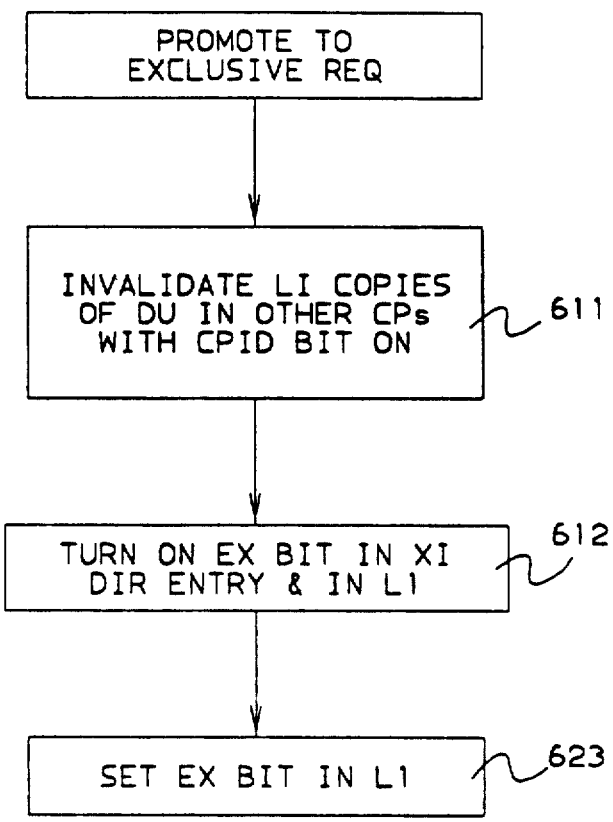
Figure 12E:
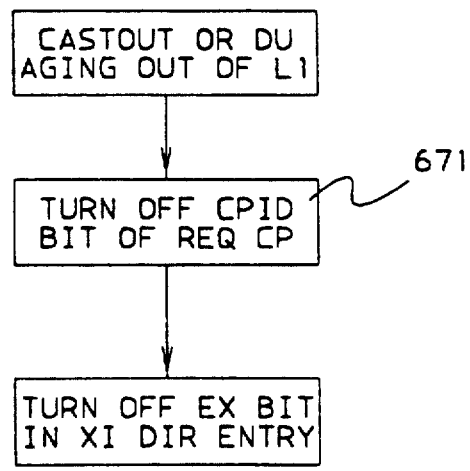

Processes in FIGS. 12A, B, C and D

The processes in FIGS. 12 is similar the the processes described for FIGS. 7 and 8, except no L2 cache is used in FIGS. 12 as represented in FIG. 9. The CPID and EX/RO fields are provided in each XI directory entry, so that only specific XI signalling is used for both exclusive and readonly requests.

The latter two digits in the reference numbers in FIGS. 12 indicate the similarity of its steps to the steps described for the FIGS. 7 and 8 for the cases of Exclusive Fetching, Readonly Fetching, Conditionally-Readonly Fetching, and Promote-to-Exclusive Ownership.

Thus, while the invention has been described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. Coherence means for a data processing system, comprising:
    a coherence (XI) directory receiving requests for a plurality of CPU caches, the coherence directory having a plurality of entries, each entry having an address representation for locating an associated data unit in a shared backing memory for backing data in private CPU caches, each entry also containing means for identifying one of the CPUs in the system as having exclusive authority to write into the associated data unit;
    means for providing a cross-invalidation (XI) signal to a CPU identified in an accessed entry in the coherence directory for terminating exclusive ownership by the CPU of the associated data unit when a request is made to the coherence directory to change the ownership of the associated data unit.

2. Coherence means for a data processing system, comprising:
    a plurality of CPU caches, and a backing memory containing data units that can be copied into the CPU caches;
    each CPU cache having a CPU directory means having plural entries, each entry having a valid field for indicating if the entry has an associated data unit in a corresponding CPU cache slot, and having an exclusive field for indicating either exclusive (EX) ownership with write capability or public (RO) ownership with only read capability of the associated data unit;
    a coherence directory in the system having a plurality of entries, each coherence directory entry having a valid field, an address field, and a CPU identifier field, the address field containing an address representation of an associated data unit in the backing memory, and the CPU identifier field identifying a CPU having ownership of the data unit when the valid field indicates the entry is valid; and
    means for providing a cross-invalidation (XI) signal to a CPU identified in an accessed entry in the coherence directory as having exclusive ownership of the associated data unit when a request is made to change the ownership of the associated data unit.

3. Coherence means for a data processing system as defined in claims 1 or 2, each coherence directory entry further comprising:
    a CPID field for containing a value uniquely representing any CPU in the system having exclusive authority for writing into the associated data unit or for containing a value representing a public ownership of the associated data unit by all CPUs for reading (but not writing in) the data unit.

4. Coherence means for a data processing system as defined in claims 1 or 2, each coherence directory entry further comprising:
    a CPID field having a plurality of bits for respectively representing the ownership state of CPUs in the system, each ownership bit indicating an ownership or no ownership by a respective CPU; and
    an EX field indicating an exclusive or public ownership for each CPU indicated as having ownership in the CPID field, only one CPU being allowed to have exclusive ownership, and any number of CPUs being allowed to have the public ownership.

5. Coherence means for a data processing system as defined in claim 4, further comprising:
    the XI directory having a plurality of congruence classes, the entries in each congruence class being set associative; and
    replacement means for selecting a replacement entry in each congruence class, including means for selecting the entry having the least number of CPID bits set on in each congruence class, and if plural entries have the same least number of bits set on then selecting any of the latter entries as the replacement entry of the congruence class.

6. Coherence means for a data processing system as defined in claims 1 or 2, the backing memory further comprising:
    a shared cache for containing data units fetchable into the plural CPU caches, the coherence directory also being the directory for the shared cache; and
    a main memory for containing data units fetchable into the shared cache.

7. Coherence means for a data processing system as defined in claims 1 or 2, the backing memory further comprising:
    a main memory for containing data units fetchable into the CPU caches.

8. Coherence means for a data processing system as defined in claim 1, in which the backing memory comprises:
    a shared cache (L2) which stores the data units associated with the entries in the shared directory means.

9. Coherence means for a data processing system as defined in claim 8, in which the backing memory comprises:
    system main storage (L3).

10. Coherence means for a data processing system as defined in claim 8, further comprising:
    plural CPID fields being provided in each directory entry for respectively identifying each L1 cache that contains a copy of all, or of a part of, the associated data unit when the EX field indicates the public (RO) ownership state, but only one of the CPID fields identifying the L1 cache containing a copy of all, or of a part of, the associated data unit when the EX field indicates the EX ownership state; and means for providing an invalidation signal selectively to the CPU(s) identified in the CPU ID fields when any CPU requests exclusive control of the line of data.

11. Coherence means for a data processing system as defined in claim 1, further comprising:

means for indicating an EX-aged condition for any entry in the coherence directory when an associated data unit has been aged-out of a CPU's private cache to a backing memory while the data unit was exclusively owned by the CPU and has not been accessed by any other CPU since being aged out; and means for immediately providing exclusive ownership to any CPU requesting the data unit (or a part of the data unit) with exclusive ownership without requiring any XI signalling.

12. Coherence means for a data processing system as defined in claim 1, further comprising:

means for indicating an exclusive-aged (EX-aged) condition for any entry in the coherence directory when an associated data unit has been aged-out of a CPU's private cache to the backing memory while the data unit is indicated to be in an exclusive state and has not been accessed by any other CPU since being aged out; and means for any CPU using a conditionally-public fetch request (i.e. conditionally-readonly fetch request) to obtain the data unit from the backing memory for the CPU's private cache without requiring any XI signalling to maintain the coherence of data in the system, exclusive ownership being obtained if the requesting CPU is the same CPU from which the data unit aged-out, but public ownership being obtained if the request is made by a CPU different from the CPU from which the data unit aged-out.

13. Coherence means for a data processing system as defined in claims 11 or 12, further comprising:

each XI directory entry having an EX field and an EX-aged field, the EX-aged field being set on when the associated data unit is aged out of a processor private cache while the EX field indicates an exclusive ownership for the associated data unit.

14. Coherence means for a data processing system as defined in claim 13, further comprising:

the EX-aged field being set off when any CPU accesses the associated data unit from the backing memory while the EX-aged field was set on.

15. Coherence means for a data processing system as defined in claims 1 or 12, further comprising:

means for aging out from a CPU's private cache of a publically owned data unit, or of all parts of the data unit; and means for resetting a CPID bit in an XI directory entry for the CPU from which the aging out occurred to indicate no ownership then exists for the CPU.

16. Coherence means for a data processing system as defined in claim 1, further comprising:

each entry in each private CPU directory, when indicated as valid, representing an associated data unit in a related private CPU cache, the associated data unit being a submultiple part of a backing data unit in the backing memory and being associated with an XI directory entry locatable with the same address (with or without translation) as the L1 directory entry;

only one private CPU directory in the system being allowed to have exclusive ownership of any backing data unit; and means for accessing a different submultiple of the XI directory entry's associated data unit from the backing store when a CPU request misses in its private CPU directory and hits an XI directory entry using the same address, and the requesting CPU obtains exclusive ownership of the new submultiple data unit without requiring any XI signalling.

17. Coherence means for a data processing system as defined in claim 1, further comprising:

each valid entry in each private CPU directory representing an L1 data unit in an associated private CPU L1 cache, each L1 data unit having a submultiple size of a data unit represented by an XI directory entry, each L1 data unit being any submultiple of the XI directory represented data unit; and means for accessing any submultiple of any backing data unit by a conditionally-public CPU request which misses in its private CPU directory and hits an XI directory entry which indicates public ownership of the associated backing data unit without doing any XI signalling, and means for indicating readonly ownership in the private directory for the accessed submultiple provided to the private cache.

18. Coherence means for a data processing system as defined in claim 1, further comprising:

each valid entry in each private CPU directory representing an L1 data unit in an associated private CPU L1 cache, each L1 data unit having a submultiple size of a data unit represented by an XI directory entry, each L1 data unit being any submultiple of the XI directory represented data unit; and means for accessing any submultiple of any backing data unit by a conditionally-public CPU request which misses in its private CPU directory and hits an XI directory entry which indicates exclusive ownership by the same of the associated backing data unit without doing any XI signalling, and means for indicating exclusive ownership in the private directory for the accessed submultiple provided to the private cache.

19. Coherence means for a data processing system as defined in claim 1, further comprising:

each valid entry in each private CPU directory representing an L1 data unit in an associated private CPU L1 cache, each L1 data unit having a submultiple size of a data unit represented by a coherence (XI) directory entry, each L1 data unit being any submultiple of the XI directory represented data unit;

means for sending an XI signal to each other CPU L1 directory to invalidate any submultiple of the requested data unit in the associated private cache; and means for providing public ownership of any submultiple of any backing data unit represented in the XI directory for a conditionally-public CPU request which misses in the private CPU directory and hits an XI directory entry which indicates public ownership of the associated backing data unit.

20. Coherence means for a data processing system as defined in claim 1, further comprising:

means for aging out from a CPU's private cache of an exclusively owned data unit, or of all parts of the data unit; and means for resetting a CPID bit in an XI directory entry for the CPU from which the aging out occurred to indicate no ownership then exists for the CPU, and changing exclusive ownership of the data unit to public ownership.

21. Coherence means for a data processing system as defined in claim 2, further comprising:

the private CPU caches and their directories being structured as store-through caches and directories; and means for setting to a public ownership indication an ownership field in a private CPU directory entry for an associated data unit when a fetch request by the CPU is being made for a conditionally-public fetch of a data unit in the backing memory when an associated coherence directory entry indicates public ownership.

22. Coherence means for a data processing system as defined in claim 2, further comprising:

the private CPU caches and their directories being structured as store-through caches and directories; and means for setting to a readonly ownership indication an ownership field in a private CPU directory entry for an associated data unit when a fetch request by the CPU is being made for a conditionally-public fetch of a data unit in the backing memory for which an associated coherence directory entry indicates exclusive ownership by another CPU.

23. Coherence means for a data processing system as defined in claim 2, further comprising:

CPU means for making a conditionally-public fetch request for a data unit which misses in a private cache directory of the CPU;

means for providing an entry in the private cache directory of the CPU for the missed fetch request, the entry having an associated slot in a private cache of the CPU for receiving a requested data unit;

setting to an exclusive ownership indication an ownership field in a private CPU directory entry provided for the requested data unit when the conditionally-public fetch request misses in the private CPU directory and misses in the coherence directory for which the requested data unit is fetched from a backing store, and an entry for the request is provided in the coherence (XI) directory with an exclusive ownership indication for the CPU; and means for sending an XI signal to any other CPU private cache directory indicated as exclusively owning the requested data unit, or any part thereof, to invalidate the the requested data unit, or any part thereof, in the private cache directory of such other CPU.

24. Coherence means for a data processing system as defined in claim 23, each private CPU cache further comprising:

each private cache data unit having a submultiple size of a data unit represented by a coherence (XI) directory entry, each private cache data unit being a submultiple of an XI directory represented data unit.

25. Coherence means for a data processing system as defined in claim 24, each CPU private cache and directory further comprising:

a store-through type of cache and directory.

26. Coherence means for a data processing system as defined in claim 24, each CPU private cache and directory further comprising:

a store-in type of cache and directory.

27. Coherence means for a data processing system as defined in claim 24, the backing store further comprising:

a shared store-in cache having the coherence (XI) directory as the directory of the shared store-in cache, the shared store-in cache being shared by a plurality of private CPU caches.

28. Coherence means for a data processing system as defined in claim 24, the backing store further comprising:

a shared system main memory.

29. Coherence means for a data processing system having a plurality of CPUs with private L1 caches, and the system having a shared storage containing data units accessible to the L1 caches, comprising:

shared directory means having a plurality of entries connected to the L1 caches for controlling data coherence in the system, each entry including: a valid field, an EX field, a CPU identifier (CPID) field, and an address representation for representing the location of an associated data unit in the shared storage, the valid field being set to a valid or invalid state for indicating if the entry represents an associated data unit in the shared storage, the EX field being set to indicate exclusive ownership state (EX) by the CPU identified in the CPID field if the CPU is to be enabled to write and read the associated data unit, or the EX field being reset to indicate a public ownership state (RO) if one or more of plural CPUs in the system are enabled to read but not write into the associated data unit; and means for providing an invalidation request signal to the CPU identified in the CPID field to terminate the current CPU ownership of the associated data unit when another CPU requests exclusive ownership of the data unit.

30. Coherence means for a data processing system, comprising:

a plurality of CPUs, each CPU having at least one private cache with a related directory having a plurality of entries, each CPU requested address simultaneously addressing an entry in a CPU directory and an associated data unit slot in the related CPU cache, means in each entry for indicating exclusive ownership of a data unit in the associated slot for writing into the data unit;

a coherence directory having a plurality of entries for receiving requests from a plurality of CPUs, each entry having an address representation for locating an associated data unit in a backing memory, each entry also containing means for identifying one of the CPUs in the system as having exclusive authority to write into the associated data unit;

means for providing a specific cross-invalidation (XI) signal only to a CPU identified in an accessed entry in the coherence directory for terminating the CPU's exclusive ownership of the associated data unit when an access request is made to the coherence directory to change the ownership of the data unit; and means with each CPU for signalling an XI response for indicating the CPU is giving up its exclusive ownership of the XI request's data unit.

31. Coherence means for a data processing system as defined in claim 30, further comprising:
   wait-state means for indicating when each CPU sharing the coherence directory is in wait state;
   means for detecting the current wait-state indication of the wait-state means for a CPU being sent an XI request; and
   means for immediately changing the ownership of the associated data unit (to immediately allow access of the associated data unit) if a wait state is indicated without waiting for an XI response from the CPU, but waiting for the XI response from the CPU before changing the ownership of the associated data unit if no wait state is indicated.

32. Coherence means for a data processing system as defined in claim 30, further comprising:
   resource partitions in a system respectively containing different copies of one or more operating systems, the operating system in each partition supporting program execution of tasks dispatched on one or more CPUs in the respective partitions;
   one or more CPUs of the system being time shared by an operating system in any partition;
   partition indicating means for indicating a current partition in which each CPU is currently assigned;
   means for immediately changing an ownership indication in a requested entry in the XI directory for an associated data unit (to immediately allow access of the associated data unit without waiting for an XI response from the requested CPU) when the partition indicating means indicates the requested CPU is in a different partition from the requesting CPU.

33. Coherence means for a data processing system, comprising:
   providing a coherence (XI) directory for receiving requests for a plurality of CPU caches, the coherence directory having a plurality of entries, each entry having an address representation for locating an associated data unit in a shared backing memory for backing data in private CPU caches, each entry also containing means for identifying one of the CPUs in the system as having exclusive authority to write into the associated data unit; and
   cross-invalidation (XI) signalling to a CPU identified in an accessed entry in the coherence directory for terminating exclusive ownership by the CPU of the associated data unit when a request is made to the coherence directory to change the ownership of the associated data unit.

34. Coherence means for a data processing system as defined in claim 33, further comprising:
   containing a value in a CPID field for uniquely representing any CPU in the system having exclusive authority for writing into the associated data unit or for containing a value representing a public ownership of the associated data unit by all CPUs for reading (but not writing) the data unit.

35. Coherence means for a data processing system as defined in claim 33, further comprising:
   providing a CPID field having a plurality of bits for respectively representing the ownership state of CPUs in the system, each ownership bit indicating an ownership or no ownership by a respective CPU; and
   indicating in an EX field an ownership condition for a respective CPU indicated as having either exclusive or public ownership in the CPID field, only one CPU being allowed to have exclusive ownership, and any number of CPUs being allowed to have the public ownership.

36. Coherence means for a data processing system as defined in claim 33, further comprising:
   providing a shared cache as the backing memory for containing data units fetchable into the plural CPU caches, the coherence directory also being the directory for the shared cache; and
   having a main memory for containing data units fetchable into the shared cache.

37. Coherence means for a data processing system as defined in claim 33, further comprising:
   providing a main memory for containing data units fetchable into the CPU caches.

38. Coherence means for a data processing system having a plurality of CPUs with private L1 caches, and the system having a shared storage containing data units accessible to the L1 caches, comprising:
   providing a single shared directory means having a plurality of entries connected to the L1 caches for controlling data coherence in the system, each entry including: a valid field, an EX field, a CPU identifier (CPID) field, and an address representation for representing the location of an associated data unit in the shared storage, the valid field being set to a valid or invalid state for indicating if the entry represents an associated data unit in the shared storage, the EX field being set to indicate exclusive ownership state (EX) by the CPU identified in the CPID field if the CPU is to be enabled to write and read the associated data unit, or the EX field being reset to indicate a public ownership state (RO) if one or more of plural CPUs in the system are enabled to read but not write into the associated data unit; and
   signalling an invalidation request to the CPU identified in the CPID field to terminate the current CPU ownership of the associated data unit when another CPU requests exclusive ownership of the data unit.

39. Coherence means for a data processing system as defined in claim 38, further comprising:
   providing plural CPID fields in each directory entry for respectively identifying each L1 cache that contains a copy of all, or of a part of, the associated data unit when the EX field indicates the public (RO) ownership state, but only one of the CPID fields identifying the L1 cache containing a copy of all, or of a part of, the associated data unit when the EX field indicates the EX ownership state; and
   sending an invalidation signal selectively to the CPU(s) identified in the CPU ID fields when any CPU requests exclusive control of the line of data.

40. Coherence means for a data processing system as defined in claim 39, further comprising:
   providing a specific cross-invalidation (XI) signal only to a CPU identified in an accessed entry in the coherence directory for terminating the CPU's exclusive ownership of the associated data unit when an access request is made to the coherence directory to change the ownership of the data unit; and
   signalling an XI response to a CPU cache for indicating the CPU is giving up its exclusive ownership of the data unit.

41. Coherence means for a data processing system as defined in claim 40, further comprising:

indicating a wait-state for each CPU sharing the coherence directory when the respective CPU is in wait state;

detecting the current wait-state indication for a CPU being sent an XI request; and immediately changing the ownership of the associated data unit (to immediately allow access of the associated data unit) if a wait state is indicated without waiting for an XI response from the CPU, but waiting for the XI response from the CPU before changing the ownership of the associated data unit if no wait state is indicated.

42. A coherence method for a data processing system to support parallelism of processor requests to a backing memory, comprising the steps of:

structuring the backing memory from a plurality of backing memory sections for containing backing data for a plurality of private processor caches in the system, each backing memory section having an assigned address range, providing a plurality of coherence (XI) directory sections respectively associated with the backing memory sections, and entries in each XI directory section being restricted to supporting processor addresses in the assigned address range of an associated backing memory section, registering a requested address from any of plural processors in the system in the XI directory section having the assigned address range containing the requested address, each XI directory section being shared by the processors in the system for requested addresses in the assigned memory range of the associated backing memory section, and performing coherence control in parallel in the XI directory sections for requested addresses concurrently sent by plural processors to different XI directory sections in response to misses by processor requested addresses in the private caches of the processors.

43. A coherence method for a data processing system to support parallelism of processor requests to a backing memory as defined in claim 42, further comprising the steps of:

connecting cache miss signals from all private processor caches in the system to a filtering means associated with each XI directory section and an associated backing memory section, and filtering by the filtering means of received cache miss signals to pass to an associated XI directory section and backing memory section only the signals within the assigned address range of the associated memory section.

44. A coherence method for a data processing system to support parallelism of processor requests to a backing memory as defined in claim 43, further comprising the step of:

prioritizing processor requests provided by the filtering means within the address range of the associated memory section to sequence the processor requests to the associated XI directory section and to the associated memory section.

45. A coherence method for a data processing system to support parallelism of processor requests to a backing memory as defined in claim 44, further comprising the step of:

structuring each backing memory section and the associated XI directory section to operate independently of the other backing memory sections and the other XI directory sections for the backing memory sections.

46. A coherence method for a data processing system to support parallelism of processor requests to a backing memory as defined in claim 45, further comprising the step of:

providing a plurality of separate hardware entities for performing as different backing memory sections and associated XI directory sections, each of the separate hardware entities operating independently of the other hardware entities to provide backing memory functions and associated XI directory functions for supporting a coherent memory operation.

* * * * *